CIRCULAR INTERPOLATION SYSTEM

Filed Feb. 3, 1964 18 Sheets-Sheet 1

INVENTOR.
Harvey J. Rosener
BY
Hill, Sherman, Meroni, Gross & Simpson
ATTORNEYS

CIRCULAR INTERPOLATION SYSTEM

Filed Feb. 3, 1964

INVENTOR.
Harvey J. Rosener
BY
Hill, Sherman, Meroni, Gross & Simpson
ATTORNEYS

April 14, 1970 H. J. ROSENER 3,506,812

CIRCULAR INTERPOLATION SYSTEM

Filed Feb. 3, 1964 18 Sheets-Sheet 3

INVENTOR.
Harvey J. Rosener
BY
Hill, Sherman, Meroni, Gross & Simpson
ATTORNEYS

INVENTOR.
Harvey J. Rosener
BY
Hill, Sherman, Meroni, Gross & Simpson
ATTORNEYS

INVENTOR.
Harvey J. Rosener
BY
Hill, Sherman, Meroni, Gross & Simpson
ATTORNEYS

April 14, 1970 H. J. ROSENER 3,506,812

CIRCULAR INTERPOLATION SYSTEM

Filed Feb. 3, 1964 18 Sheets-Sheet 6

INVENTOR.

Harvey J. Rosener

BY

Hill, Sherman, Meroni, Gross & Simpson

ATTORNEYS

INVENTOR.
Harvey J. Rosener
BY
Hill, Sherman, Meroni, Gross & Simpson
ATTORNEYS

INVENTOR.
Harvey J. Rosener
BY
Hill, Sherman, Meroni, Gross & Simpson
ATTORNEYS

April 14, 1970 H. J. ROSENER 3,506,812

CIRCULAR INTERPOLATION SYSTEM

Filed Feb. 3, 1964 18 Sheets-Sheet 9

INVENTOR.
Harvey J. Rosener
BY
Hill, Sherman, Meroni, Gross & Simpson
ATTORNEYS

INVENTOR.
Harvey J. Rosener
BY
Hill, Sherman, Meroni, Gross & Simpson
ATTORNEYS

INVENTOR.
Harvey J. Rosener
BY
Hill, Sherman, Meroni, Gross & Simpson
ATTORNEYS

INVENTOR.
Harvey J. Rosener
BY
Hill, Sherman, Meroni, Gross & Simpson
ATTORNEYS

INVENTOR.
Harvey J. Rosener
BY
Hill, Sherman, Meroni, Gross & Simpson
ATTORNEYS

INVENTOR.
Harvey J. Rosener
BY
Hill, Sherman, Meroni, Gross & Simpson
ATTORNEYS

INVENTOR.
Harvey J. Rosener
BY
Hill, Sherman, Meroni, Gross & Simpson
ATTORNEYS

INVENTOR.
Harvey J. Rosener
BY
Hill, Sherman, Meroni, Gross & Simpson
ATTORNEYS

INVENTOR.
Harvey J. Rosener
BY
Hill, Sherman, Meroni, Gross & Simpson
ATTORNEYS

CIRCULAR INTERPOLATION SYSTEM

Filed Feb. 3, 1964 18 Sheets-Sheet 18

INVENTOR.
Harvey J. Rosener
BY
Hill, Sherman, Meroni, Gross & Simpson
ATTORNEYS

United States Patent Office 3,506,812
Patented Apr. 14, 1970

3,506,812

CIRCULAR INTERPOLATION SYSTEM

Harvey J. Rosener, Dayton, Ohio, assignor, by mesne assignments, to The Bunker-Ramo Corporation, Stamford, Conn., a corporation of Delaware Filed Feb. 3, 1964, Ser. No. 341,958
Int. Cl. G06f 7/38, 15/46
U.S. Cl. 235—152 29 Claims

ABSTRACT OF THE DISCLOSURE

A numerical control system for responding to program information to generate trains of command pulses on $x$ and $y$ output lines for performing relative $x$ and $y$ movements proportional to the respective numbers of command pulses comprising a pair of operational integrators each having an integrand register and an accumulator register, a pulse code unit operable through a cycle of operation to produce four series of pulses and a carry pulse in each cycle of operation thereof with the numbers of pulses in said series being selectively addable to produce any number from one through nine and with the pulses of each series being non-coincident with the carry pulse and the pulses of the other series, serially connected register units in said accumulator register each comprising a decade counter having an input and an output, four gates for selectively applying said four series of pulses to said decade counter input, means for storing an output pulse from said decade counter, means responsive to a carry pulse from said pulse code unit for transmitting a stored output pulse to the input of a subsequent unit, serially connected register units in said integrand register and four lines connecting said gates of each accumulator register unit to an integrand register unit for parallel control therefrom. The operational integrators may be selectively interconnected for linear or circular interpolation.

This invention relates to a circular interpolation system which was particularly designed as a numerical control system for machine tools but which incorporates various features having applications in digital computers and other types of digital systems. The system of this invention is highly accurate and reliable in operation, quite versatile, readily operated and capable of high speed operation, while being comparatively compact in using a minimum number of component parts.

In numerical control systems for machine tools, DDA (digital differential analyzer) systems have heretofore been proposed to permit the programming in a single data block of a circular path of movement. Such systems would obviate the necessity of programming a large number of incremental straight line segments to move in a circular path, which is very costly and imposes strict duty requirement on tape readers to obtain satisfactory operating speed. However, the DDA systems heretofore proposed have had limitations with respect to accuracy, reliability, speed and versatility and have been quite complicated and not readily operated and maintained.

According to this invention, a numerical control system is provided using a digital differential analyzer having a parallel to serial accumulation feature which provides accurate and reliable high speed operation and other advantages. In particular, a pair of operational integrators are provided each including an integrand register and an accumulator register, each including a plurality of serially connected units with parallel connections between units of the accumulator register and units of the integrand register. Means are provided for simultaneously operating all of the accumulator register units through an addition cycle to cause each unit to add a number stored therein at the beginning of a cycle to a number supplied in parallel from the associated integrand register unit, and also to cause transmission of pulses serially from each accumulator register unit to a succeeding unit. With this arrangement, the addition operation can be carried out at a high rate of speed. In addition, information can be readily applied initially to the integrand registers, which are preferably decade units, and most preferably are units having four flip-flops each, to which information may be applied using a 5, 2, 1', 1 code.

According to a specific feature of the invention, each accumulator register unit comprises a decade having an input connected to four gates which are selectively enabled from signals applied directly from an associated integrand register unit, and such gates are connected to a pulse code unit which operates through a cycle of operation to apply four series of pulses in each cycle of operation with the number of pulses in the four series being selectively addable to produce any number from one through nine. Preferably, the 5, 2, 1', 1 code is used, five pulses being applied in each cycle to one gate, two pulses to a second gate, and one pulse each to the other two gates, the pulses being non-coincident. In addition, a storage means in the form of a flip-flop is provided for storing a carry pulse from the decade, and the stored carry pulse is controllably released by a carry pulse from the pulse code unit, the carry pulse from the pulse code unit being non-coincident with other pulses produced thereby.

With this arrangement, an addition operation may be performed with application of only ten input pulses to the pulse code unit. In addition, the information applied in parallel from the integrand units may be modified during the carry time of the pulse code unit, so as not to interfere with the addition operation. Additional advantages are that the input can be stopped at any time without loss of information in the integrand and accumulator registers, and a variable frequency input may be used, to obtain any desired feed rate.

Additionally, pulses may be supplied to output lines from different units of the accumulator register, as desired, and pulses may also be fed back from such units to the first or other units of the integrand register, and various different modes of both linear and circular interpolation operation may be obtained. In addition, the system can be readily used in variable lead thread cutting operation.

Another important feature of the invention is in the construction of the integrand unit to which information can be readily applied initially in parallel, and which can thereafter be modified serially in an up-counting or down-counting operation as required to generate the proper output signals.

A further feature of the invention is in a zero detection system, used in the integrand registers and also in end point diminishing storage registers.

Still another feature of the invention is in the provision of compensating circuits for deleting pulses in certain modes of operation in order to obtain the highest possible accuracy.

Still further features of the invention relate to start-stop control and end point correction circuits, which insure that a programmed end point will be reached, while following a path which is as close as possible to the programmed path of movement.

Still other features relate to circuit arrangements for obtaining the highest possible accuracy and reliability in the system.

Other and more specific objects, features and advantages of the invention will become more fully apparent from the following detailed description taken in conjunction with the accompanying drawings which illustrate preferred embodiments and in which.

Figure 1:
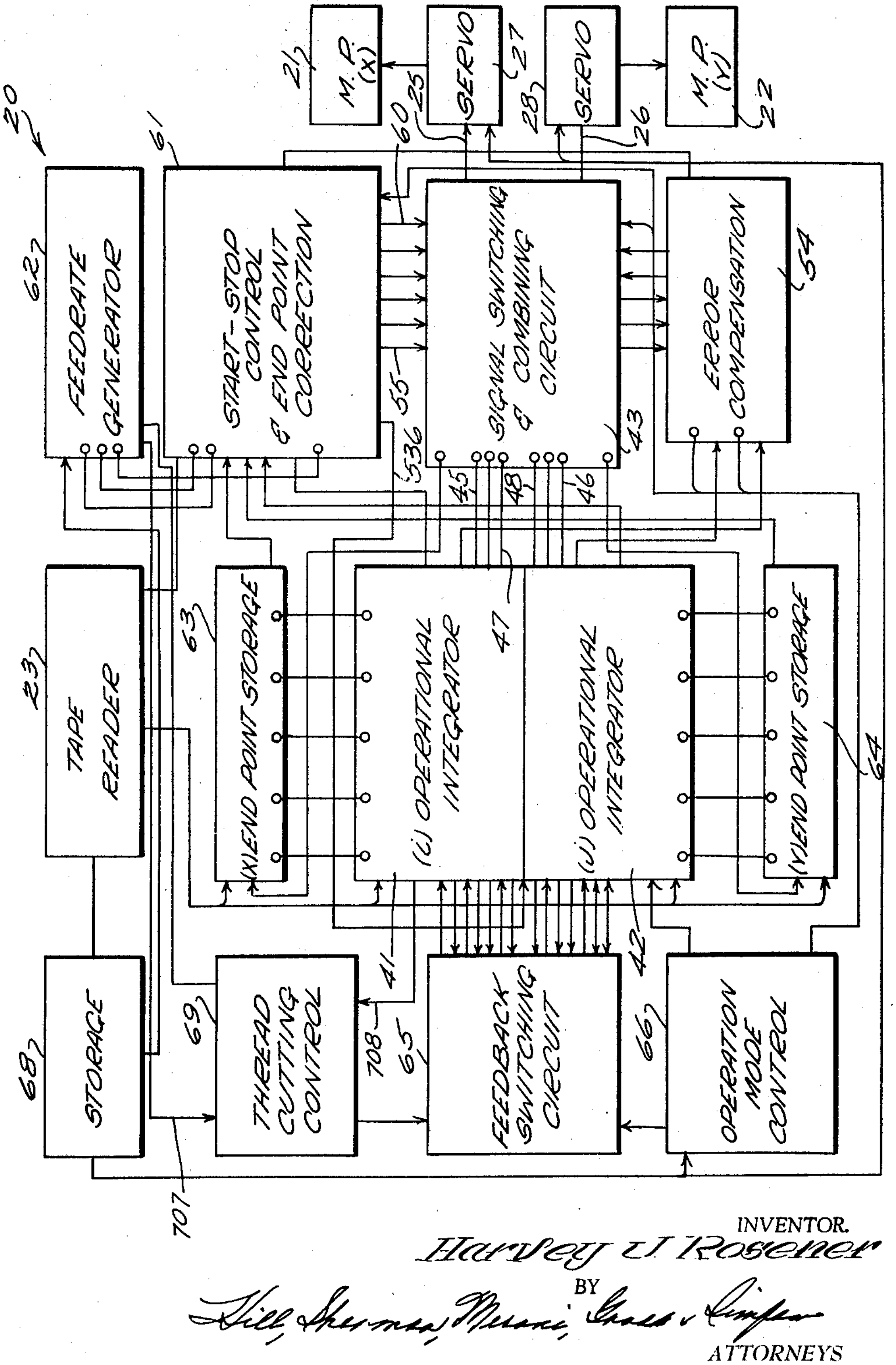
FIGURE 1 is a block diagram of a numerical control system for a machine tool, constructed according to the principles of this invention.

Reference numeral 20 generally designates a system constructed according to this invention, arranged to control the movement of machine parts 21 and 22 which may, for example, be operated in *x* and *y* directions to cause relative movement between a cutter and a workpiece in mutually perpendicular directions.

In general, the system 20 comprises a tape reader 23 which reads a block of information from punched tape and supplies it to various circuits, the overall function of which is to develop *x* and *y* command pulse trains on lines 25 and 26 which are applied to servo systems 27 and 28 which operate to move the parts 21 and 22 in proportion to the number of command pulses on lines 25 and 26. For example, each command pulse may cause movement of the corresponding part through a distance of 0.0001 inch.

The system can be operated with linear interpolation to cause straight line movement of one part relative to the other, or may be operated with circular interpolation to cause one part to move relative to the other in an arcuate path. The system can additionally be used in a thread cutting mode of operation as described in detail hereinafter. Such operations are selectively obtained in accordance with information programmed on the punched tape.

For linear interpolation, the directions and distances of the *x* and *y* movements are programmed. For circular interpolation, such *x* and *y* distances are also programmed to provide "end point" information as to where the arcuate movement should end, and *i* and *j* words are programmed, according to the *x* and *y* distances from the starting point of the arcuate movement to the center of the circle, and an additional preparatory *g* word is programmed containing information as to the direction of the arcuate movement, whether clockwise or counterclockwise. The signs of the *i* and *j* distances need not be programmed but can be determined from the *g* word and the signs of *x* and *y* distances.

The *g* preparatory word may also contain information as to whether a long, normal or short dimension or radius operation is to take place, the purpose of such information being clarified below. The *g* preparatory word may also cause operation in a thread cutting mode, as also described hereinbelow.

Additionally, feed rate information may be programmed to determine the velocity of movement of one part relative to another.

Figure 2:
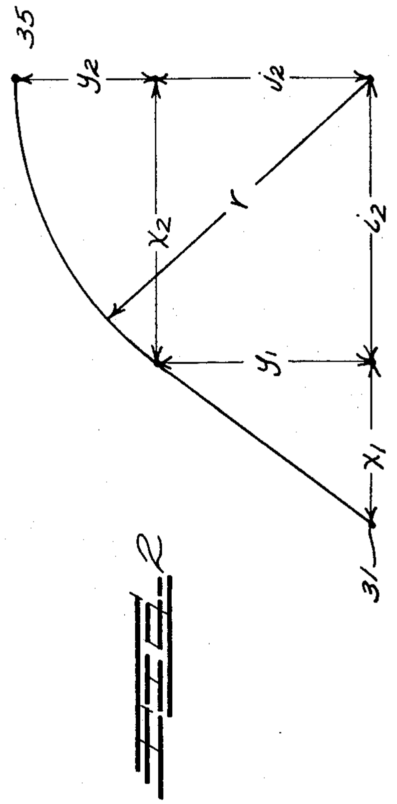
FIGURE 2 is a graph illustrating an example of paths of movement which may be programmed and obtained with the system of FIGURE 1.

As an example of the linear and circular interpolation modes of operation, assume that it is desired to move the center of a cutter upwardly and to the right in a linear path 30 from a point 31 to a point 32 as illustrated in FIGURE 2, points 31 and 32 being spaced horizontally 3.0000 inches and being spaced vertically 4.0000 inches apart. Assume further that it is then desired to move the cutter center clockwise in an arcuate path 33 about a center 34 spaced downwardly and to the right from the point 32 through a horizontal distance of 5.3333 inches and a vertical distance of 4.0000 inches, to an end point 35 spaced horizontally a distance of 5.3333 inches from the point 32 and spaced vertically a distance of 1.3333 inches from the point 32.

A first block of tape would be programmed with a preparatory *g* word indicating linear interpolation and normal dimension, with an *x* word of 3.0000, with a *y* word of 4.0000, and with positive signs for both *x* and *y*. A second block of information would be programmed with a *g* word indicating circular interpolation, clockwise rotation and normal dimension or radius, with an *x* word of 5.3333, with a *y* word 2.6666, with positive signs for both *x* and *y*, with an *i* word of 5.3333 and with a *j* word of 4.0000.

To develop the command pulse trains on the lines 25 and 26, a digital differential analyzer system is employed, including a pair of operational integrators 41 and 42, respectively designated as *i* and *j* integrators. The integrators 41 and 42 develop trains of command pulses which are applied to a signal switching and combining circuit 43 either through a pair of lines 45 and 46 or through a pair of lines 47 and 48, depending upon the mode of operation, lines 45 and 46 being used in linear interpolation and long radius circular interpolation while lines 47 and 48 are used in normal or short radius circular interpolation.

The switching and combining circuit 43 has two outputs connected to the lines 25 and 26 and is controlled according to whether circular or linear interpolation is desired and also in circular interpolation operation, according to whether a long axis mode of operation is desired. The circuit 43 also incorporates gates which are controlled from signals applied through lines 51 and 52 from an error compensation circuit 54 which serves to delete pulses at certain times, during a long radius mode of operation, to correct slight errors which might otherwise result.

The circuit 43 is further connected through lines 55–60 to a start-stop control and end-point correction circuit 61 which is connected to a common input for the operational integrators 41 and 42. The start-stop control and end-point correction circuit 61 is additionally connected to a feed rate generator 62 and also to *x* and *y* end-point storage circuits 63 and 64. In general, the circuit 61 operates to provide a synchronized start of the operation of the integrators 41 and 42, to stop the integrators 41 and 42 at the proper time, and additionally to supply pulses to insure that a programmed end-point will be reached, as determined from *x* and *y* words stored in the end point storage circuits 63 and 64.

A feedback switching circuit 65 is connected to the operational integrators 41 and 42 to control the mode of operation thereof. The feedback switching circuit 65 is controlled from an operation mode control circuit 66 which is also connected to the integrators 41 and 42, the error compensation 43, the switch unit 55 and the start-stop control and end-point correction circuit 61. The operation mode control circuit 66 in turn is controlled from a storage unit 68 controlled from the tape reader 23. The storage unit 68 also controls the feed rate generator 62 and supplies *x* and *y* sign signals to gates in the inputs of the servo system 27 and 28.

In addition, a thread cutting control circuit 69 may be incorporated in the system and connected to various portions thereof, the circuit 69 being controlled from the storage unit 68.

OPERATIONAL INTEGRATORS 41 AND 42

Figure 3:
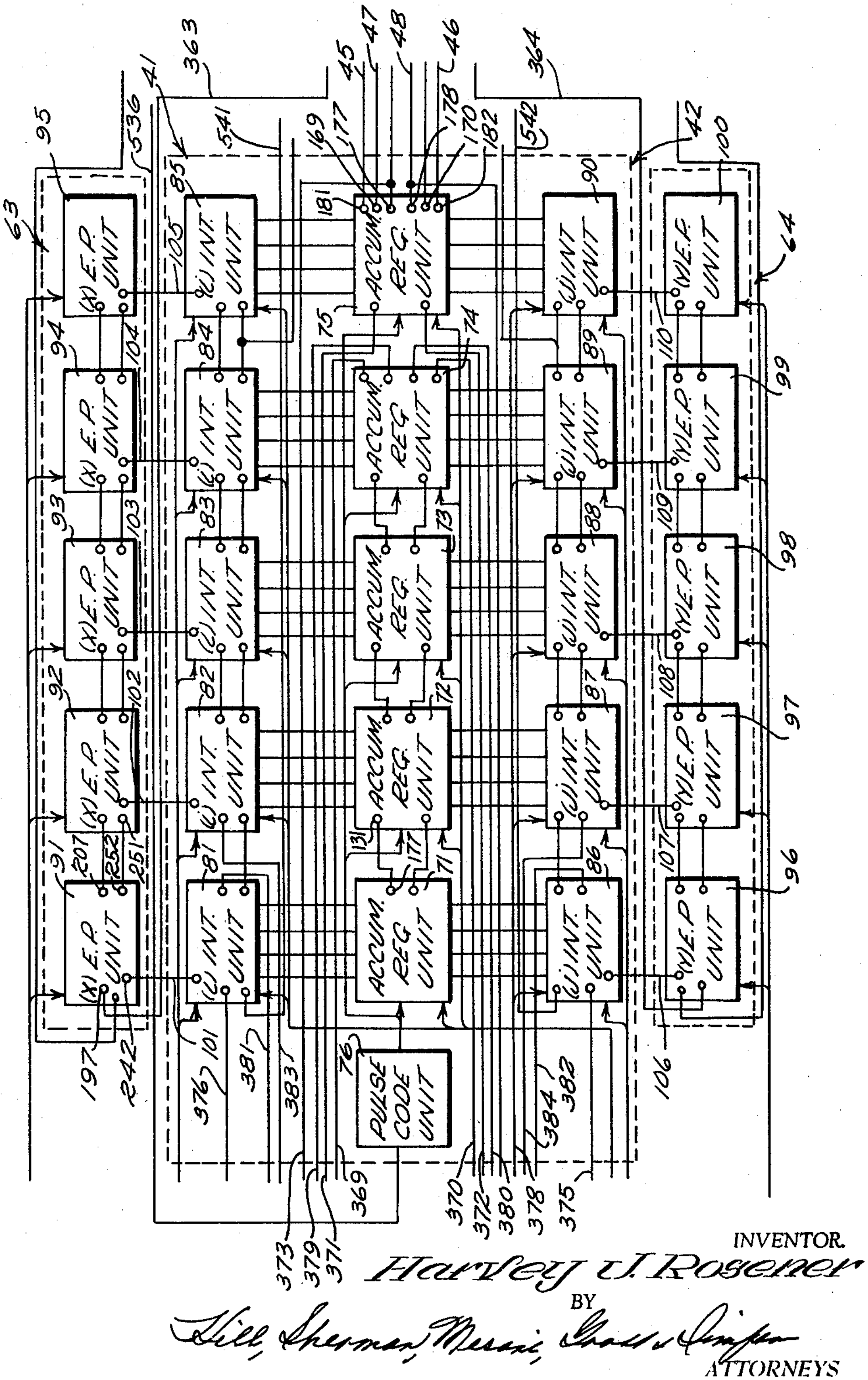
FIGURE 3 is a block diagram of operational integrators and end point storage registers of the system of FIGURE 1.

Referring to FIGURE 3, the operational integrators 41 and 42 are in the form of digital differential analyzers each including accumulator and integrand registers. The accumulator registers include five dual channel units 71–75 each of which contains circuits of both the operational integrator 41 and the operation integrator 42. The units 71–75 are supplied with signals from a pulse code unit 76, operative in a manner as described below.

Five integrand register units 81–85 form the integrand register of the integrator 41, while five integrand register units 86–90 form the integrand register of the integrator 42. As also shown in FIGURE 3, the end point storage unit 63 comprises five register units 91–95 while the end-point storage circuit 64 comprises five register units 96–100.

In both linear and circular interpolation, an *x* number or word is entered into the end point register units 91–95, the least significant digit being entered in the unit 95. Similarly, a *y* number is entered into the register units 96–100.

In linear interpolation, such *x* and *y* numbers are also entered into the integrand units 81–85 and the integrand units 86–90, through lines 101–105 and 106–110. The *x* and *y* numbers so stored in the integrand units 81–85 and 86–90 are cyclically added through the operation of the dual channel accumulator register units 71–75, and output pulses are developed on lines 45 and 46, connected to the final unit 75, at rates proportional to the numbers stored in the integrand units 81–85 and 86–90. Output pulses are also developed on lines 47 and 48 at rates which are one-tenth the rates at which they are developed on the lines 45 and 46.

In normal linear interpolation, the lines 45 and 46 are connected through the switching and control circuit 43 to the output lines 25 and 26, respectively, and the servo systems 27 and 28 move the machine parts 21 and 22 in proportion thereto.

As an example of such linear interpolation operation, assume that it is desired to move a cutter relative to a workpiece along the linear path 30 from the point 31 to the point 32 as illustrated in FIGURE 2. The numbers 3.0000 and 4.0000 would be entered into the integrand units 81–85 and 86–90 and in a given interval of time, 30,000 and 40,000 pulses would be developed on the lines 45 and 46, connected to the lines 25 and 26, respectively. After development of such pulses, the integrators 41 and 42 would be stopped in response to signals from the end-point storage circuits 63 and 64, assuming normal linear interpolation operation. In long dimension linear interpolation 10 times as many pulses would be developed before stopping, as explained below, whereby 10 times as many pulses would be developed with the same numbers entered into the units.

In circular interpolation, *x* and *y* numbers or words are entered into the end-point register units 91–95 and 96–100, while *i* and *j* words are entered into the integrand units 81–85 and 86–90, as above indicated. In such circular interpolation operation, however, the connections are reversed in the signal switching and combining circuit 43 such that in normal circular interpolation operation, the lines 45 and 46 or the lines 47 and 48 are connected to the lines 26 and 25, respectively, and the initial rate of generation of pulses on the line 25 is determined by the number entered into the *j* integrand 86–90 while the initial rate of generation of pulses on the line 26 is determined by the number entered into the *i* integrator units 81–85. In circular interpolation, feedback connections are provided in the feedback switching unit 65, such that the numbers stored in the integrand units 81–85 and 86–90 are changed in response to output pulses, in a manner such as to vary the rates of generation of the pulses, and to cause relative movements of the parts in a circular path, rather than a linear path.

ACCUMULATOR REGISTER UNITS 71–75

Figures 4, 5:
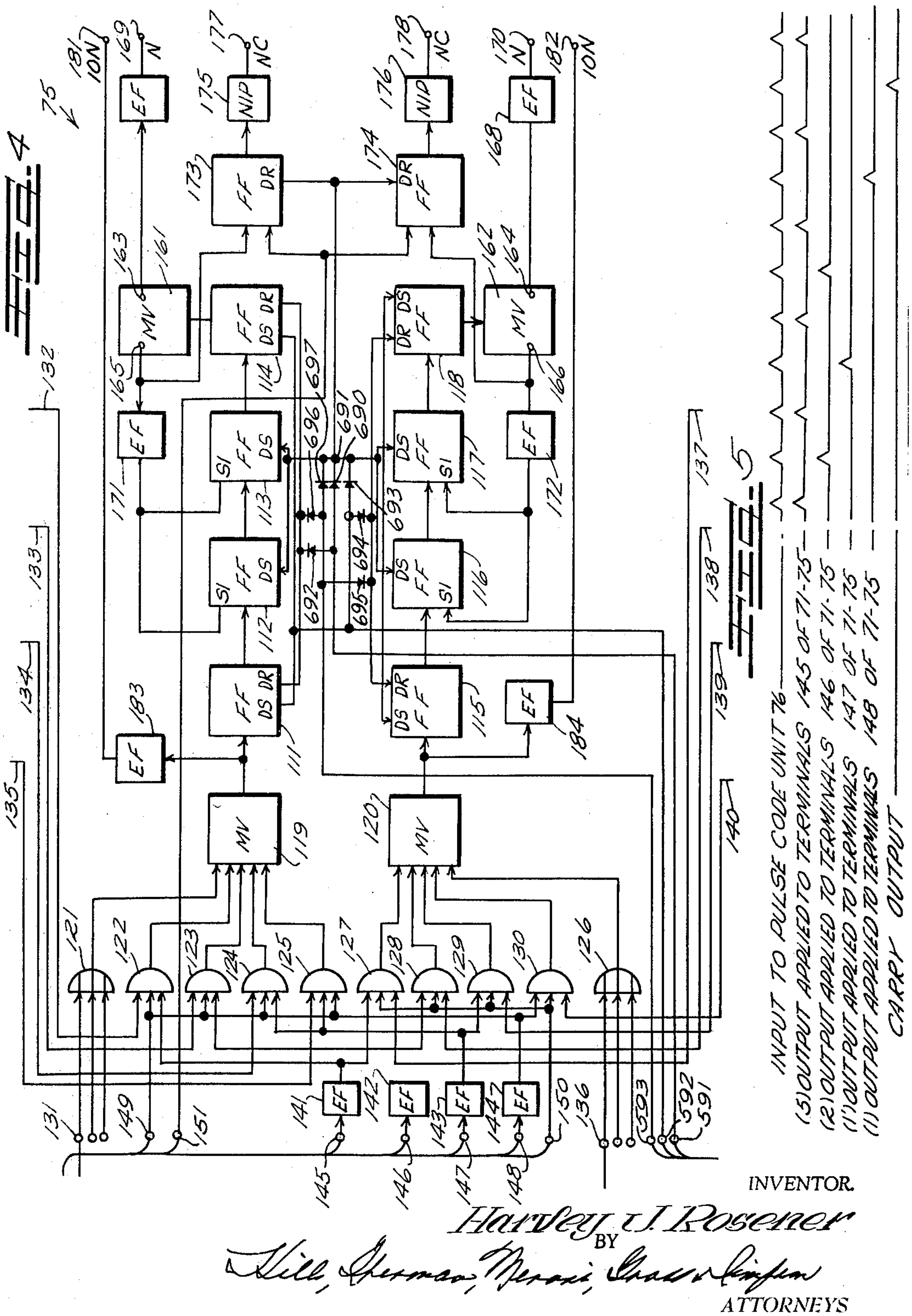
FIGURE 4 is a block diagram of one of five dual channel accumulator register units of the operational integrators of FIGURE 3.
FIGURE 5 is a graph showing the timed relationship of pulses produced by a pulse code unit of the integrators of FIGURE 3.

FIGURE 4 illustrates the circuit of the final dual channel accumulator register unit 75, the circuits of the other four register units 71–74 being identical thereto. In general, each register unit has an operating cycle in which it adds a number initially stored therein to a number stored in a corresponding integrand unit, and to supply the results of such addition to a subsequent unit or other circuit.

The register unit 75 comprises a divide-by-10 register or decade counter for each channel, including four flip-flops 111–114 for the *i* channel and four flip-flops 115–118 for the *j* channel. The inputs of the first flip-flops 111 and 115 are connected to the outputs of monostable multivibrators 119 and 120 each of which has five input terminals, connected to an OR gate in the input circuit of the multivibrator. One input of the multivibrator 119 is connected to the output of an OR gate 121, and the other four inputs are connected to the outputs of AND gates 122–125.

Similarly, the inputs of the multivibrator 120 are connected to the outputs of an OR gate 126 and four AND gates 127–130. The OR gate 121 has one input connected to an input terminal 131 and to additional inputs which are not used in the illustrated system, but are provided as auxiliaries. The input terminal 131 is connected to an output from a preceding decade to receive carry pulses in a manner to be described. The AND gates 122–125 have inputs connected through lines 132–135 to outputs from the corresponding *i* integrand unit, in this case the unit 85. Similarly, the OR gate 126 has an input connected to an input terminal 136 and the AND gates 127–130 have inputs connected through lines 137–140 to the corresponding *j* integrand unit, in this case the unit 90.

Four emitter followers 141–144 are provided having inputs connected to input terminals 145–148 and having output terminals connected to inputs of the gates 122–125 and also to inputs of the gates 127–130. In addition, inputs of all four gates 122–125 are connected to a terminal 149, while inputs of all four gates 127–130 are connected to an input terminal 150. Enabling signals are applied to the terminals 149 and 150, to render the units operative.

The input terminals 145–148 and also an input terminal 151 are connected to outputs of the pulse code unit, which is a decade unit of a type known in the art, operative to supply pulses with a 5, 2, 1′, 1 code, in response to supply of input pulses thereto. The timed relation of such pulses is shown in FIGURE 5. In response to a cycle of operation wherein ten input pulses are applied to the pulse code unit, five pulses are developed at a first output which is connected to the terminal 145, and to like terminals of the other units. That output is designated as the (5) output and it will be noted that the five pulses are developed coincident with the first, third, fifth, seventh and ninth input pulses of a cycle. A (2) output, connected to terminal 146, develops two pulses coincident with the second and sixth pulses of each cycle, a (1′) output, connected to terminal 147, develops one output pulse coincident with the fourth input pulse of each cycle, and a (1) output, connected to the terminal 148, also develops one output pulse coincident with the eighth pulse of each cycle. In addition, the unit 76 develops a carry output pulse, coincident with the tenth or final pulse of each cycle, such being applied to the terminal 151.

In operation, the decade counter which includes the flip-flops 111–114 is advanced in count in response to each series of ten input pulses to the pulse code unit, according to which of the gates 122–125 is enabled from signals applied from the corresponding integrand unit. By way of example, if the flip-flops 111–114 are initially in a zero-count condition and if enabling signals are applied to the (5) and (2) input lines 132 and 133, the decade counter formed by the flip-flops will be advanced to a count of seven in response to a cycle of operation wherein ten pulses are applied from the pulse code unit 76. With enabling signals applied to the (2) input 133, the (1′) input 134 and the (1) input 135 in the next cycle the decade counter would be advanced by a count of four in response to the series of ten input pulses of the next cycle. It would, however, reset at the count of 10 so that in this example, the counter would register one after two cycles with a total of 20 input pulses.

Accordingly, an addition operation is performed by each accumulator register unit during each cycle wherein ten input pulses are applied to the pulse code unit 76, the number stored in the corresponding integrand unit during one cycle being added to the number stored in the accumulator register unit during the preceding cycle.

With respect to the operation of the decade counters in the accumulator register units, reset outputs of the flip-flops 111–113 and 115–117 are respectively connected to binary inputs of flip-flops 112–114 and 116–118. Reset outputs of the flip-flops 114 and 118 are connected to inputs of monostable multivibrators 161 and 162 having output terminals 163 and 164 at which output signtls are developed immediately upon triggering of the multivibrators and having additional output terminals 165 and 166 at which output signals are developed after a certain delay, preferably on the order of two microseconds. Output terminals 163 and 164 are connected through emitter followers 167 and 168 to output terminals 169 and 170. Output terminals 165 are connected through emitter followers 171 and 172 to said input of flip-flops 112, 113 and 116, 117. Such output terminals 165 and 166 are additionally connected to said inputs of a pair of carry pulses storage flip-flops 173 and 174 having reset inputs connected to the terminal 151 and having set outputs connected to the inputs of negative input pulsers 175 and 176, the outputs of which are connected to output terminals 177 and 178.

In operation of the *i* decade including flip-flops 111–114 (which is the same as that of the *j* decade), the flip-flops 111 and 114 may be assumed to be initially in the reset condition, while flip-flops 112 and 113 may be assumed to be in a set condition. The first pulse applied from the multivibrator 119 sets the flip-flop 111. The second pulse resets the flip-flop 111 which resets the flip-flop 112, which resets the flip-flop 113, which sets the flip-flop 114. The third pulse sets the flip-flop 111. The fourth pulse resets the flip-flop 111 and sets the flip-flop 112. The fifth pulse sets the flip-flop 111. The sixth pulse resets the flip-flop 111 which resets the flip-flop 112, which sets the flip-flop 113. The seventh pulse sets the flip-flop 111. The eighth pulse resets the flip-flop 111 which sets the flip-flop 112. The ninth pulse sets the flip-flop 111. The tenth pulse resets the flip-flop 111, which resets the flip-flop 112, which resets the flip-flop 113, which resets the flip-flop 114. When the flip-flop 114 is reset, the monostable multivibrator 161 is operated and after a certain delay, on the order of two microseconds, a signal is developed at the output terminal 165 which is applied through the emitter follower 171 to the set inputs of flip-flops 112 and 113 to place the same in a set condition. The counter is then in its initial condition with the flip-flops 111 and 114 being reset and with the flip-flops 112 and 113 being set.

When the delayed signal is developed at the output terminals 165 of the delay multivibrator 161, the carry pulse storage flip-flop 173 is placed in a set condition. Thereafter, when the next carry pulse is applied from the pulse code unit, the flip-flop 173 is reset, and the negative input pulser 175 develops an output signal at the terminal 177.

The output signal at the terminal 177 is referred to herein as a normal controlled carry signal or "NC" signal and it is applied to the input terminal 131 of the next succeeding accumulator register unit. In the case of the final unit 75, the terminal 177 and also the terminal 178 are not connected to a succeeding accumulator unit, but may be connected to an integrand unit through the feedback switching circuit 65 in a manner to be described. However, the input terminals 131 and 136 of the final unit 75 are connected to the normal controlled carry output terminals 177 and 178 of the preceding accumulator register unit 75.

It is important to note that the controlled carry signal is generated in synchronism with the carry signal from the pulse code unit and therefore it is not in time coincidence with other output signals from the pulse code unit 176. Accordingly, the signals applied to the multivibrators 119 and 120 from the terminals 131 and 136 are not coincident with, and do not interfere with, the signals applied thereto from gates 122–125 and 127–130. Also, as will be clarified hereinafter, feedback switching signals applied from the controlled carry output terminals 177 and 178 to integrand units 86 and 81 or 87 and 82 cause operation of the integrand units and change the signals which may be applied on lines 132–135 and 137–140, at a time which is not coincident with code pulses applied from the pulse code unit 76 to input terminals 145–148.

The output terminals 169 and 170 are referred to herein as normal or N outputs. An addition pair of output terminals 181 and 182 are provided, designated as "Ten Normal" or "10 N" terminals. Pulses are developed at such terminals at a rate equal to ten times the rate of generation of pulses at the N terminals 169 and 170. In particular, terminals 181 and 182 are connected to the outputs of the monostable multivibrators 119 and 120. Thus, the input pulses to the decade counters are applied through the emitter followers 183 and 184 to the output terminals 181 and 182.

Accordingly, each of the accumulator register units performs an addition operation during each cycle of operation of the pulse code unit 76, the number stored in the corresponding integrand units being added to the numbers stored in the two channels of the accumulator register unit during the preceding cycle. Three pairs of outputs are developed by each accumulator register unit. First, the "Normal" output pulses are developed at the N output terminals 169 and 170, developed upon resetting of the decade counters of the unit. Secondly, each unit develops "Normal Controlled" pulses at the NC output terminals 177 and 178, equivalent to the Normal pulses stored in the flip-flops 173 and 174, and generated in synchronism with the carry pulse from the pulse code unit 76. Thirdly, each unit develops the "Ten Normal" pulses at the 10 N terminals 181 and 182.

As above indicated, the NC output terminals 177 and 178 of each unit are connected to the input terminals 131 and 136 of the succeeding unit. The NC output terminals 177 and 178 of the final unit, also the N output terminals 169 and 170 and the 10 N output terminals 181 and 182 of the final unit 75, and in some cases those terminals of the fourth unit 74, are connected in various modes of operation, as will be clarified hereinafter. First, however, the construction and operation of the integrand register units, and also the end storage register units, will be described.

END POINT STORAGE UNITS

Although they are not an essential part of the operational integrators, the end point storage units are described at this point because they are similar to but simpler than the integrand units, and it is believed that a clear understanding of the more complicated integrand units will be facilitated by first describing the end point storage units.

Figure 6:
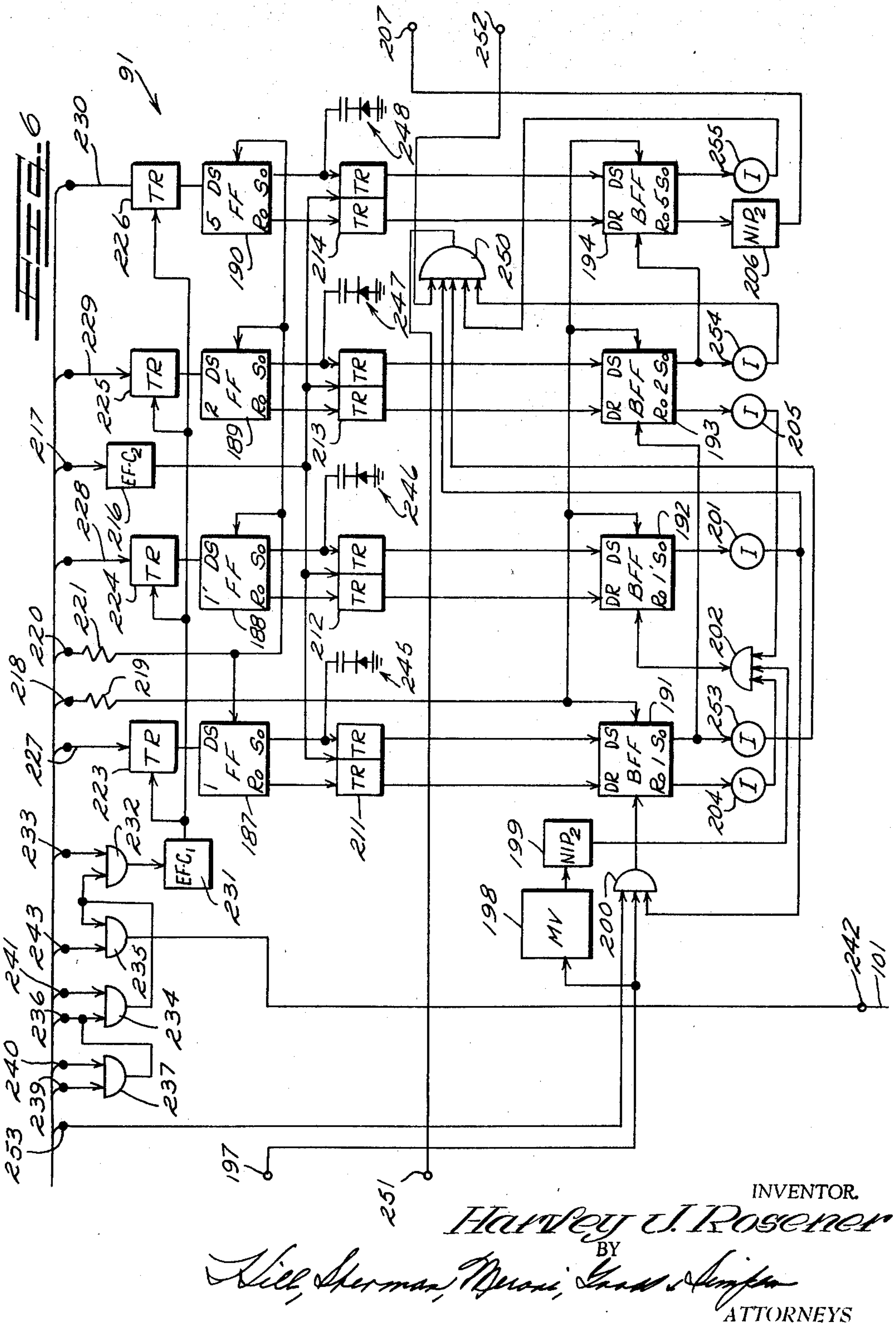
FIGURE 6 is a block diagram of one of ten end point storage units of the system.

FIGURE 6 illustrates the end storage unit 91 which is substantially the same as the other end storage units 92–100. In general, the end storage unit 91 comprises an intermediate or buffer storage section including four flip-flops 187–190 and a final or operating storage section including four flip-flops 191–194. The four flip-flops 191–194 of the final storage section operate as a decade with a 5, 2, 1', 1 code which can be serially diminished, the decades of the final storage sections of the units of each end point storage circuit being connected in series. An $x$ or $y$ word or number is initially supplied from the tape reader to the intermediate storage sections and is transferred in parallel to the final storage sections of the units. Thus, in the $x$ end point storage circuit 63, the least significant digit may be entered into the final storage of the unit 91, while the most significant digit is entered into the final storage of the unit 95. Thereafter, input pulses are applied to the first unit, and the stored number is serially diminished until it reaches 0, whereupon the generation of command pulses may be stopped, or other operations may be performed as hereinafter described.

The flip-flops 191–194 are initially placed in either set or reset conditions to store a digit having the value of from 0 to 9, with a 5, 2, 1', 1 code, flip-flop 191 being the (1) flip-flop, flip-flop 192 being the (1') flip-flop, flip-flop 193 being the (2) flip-flop and flip-flop 194 being the (5) flip-flop. Thus, a four might be stored by placing flip-flops 191, 192 and 193 in their set conditions with flip-flop 194 in a reset condition, or a 9 may be stored by placing all flip-flops in a set condition.

To explain the operation, it may be assumed that a 9 is stored by placing all four flip-flops 191–194 in the set conditions thereof. An input pulse applied at an input terminal 197 will trigger a monostable delay multivibrator 198 having an output connected to the input of a negative input pulser 199, functioning to develop a pulse at the output of the negative input pulser 199 after a certain delay, preferably on the order of three microseconds. The input pulse is also applied to an input of a gate 200, but the gate 200 will be closed under the assumed conditions with one input thereof being connected through an inverter 201 to the set output of the flip-flop 192. The delayed pulse at the output of the negative input pulser 199 is applied through a gate 202 to a binary input terminal of the flip-flop 192, thereby resetting flip-flop 192. An 8, rather than a 9, is now stored.

The second input pulse applied to the terminal 197 will be applied through gate 200 to a binary input of the flip-flop 191, gate 200 being enabled by connection of one input thereof through the inverter 201 to the set input of the flip-flop 192 which at this point is in a reset condition.

A delayed pulse is again developed at the output of the negative input pulser 199 but will have no effect, gate 202 being blocked with one input thereof being connected through an inverter 204 to the reset output of the flip-flop 191. Thus, both flip-flops 191 and 192 are now in a reset condition, and a 7 is stored.

The third pulse at the input terminal 197 is applied through gate 200 to the binary input of the flip-flop 191, to place the flip-flop 191 in its set condition. When flip-flop 191 is set, the rising edge of a signal at the set output thereof is applied to the binary output of the flip-flop 193, to place 193 in a reset condition. Thus, flip-flops 191 and 194 are set, while flip-flops 192 and 193 are reset and a 6 is stored.

The fourth pulse at the input terminal 197 is applied through the gate 200 to reset the flip-flop 191. The delayed pulse at the output of the pulser 199 has no effect, gate 202 being blocked by a signal applied from the reset output of flip-flop 191 through the inverter 204, and also through the signal applied from the reset output of flip-flop 193 through an inverter 205. A 5 is now stored.

The fifth pulse is applied through gate 200 to set the flip-flop 191. The flip-flop 193 is then set by the rising edge of a signal at the set output of the flip-flop 191. Flip-flop 194 is then reset by the rising edge of a signal at the set output of the flip-flop 193. The delayed pulse at the output of the pulser 199 is then applied through gate 202 to set the flip-flop 192, gate 202 being enabled by signals applied through inverters 204 and 205 from the reset outputs of the flip-flops 191 and 193. Thus, flip-flops 191, 192 and 193 are set, flip-flop 194 is reset, and a 4 is stored.

The sixth, seventh, eighth and ninth input pulses applied to the input terminal 197 produce operations similar to those produced by the first, second, third and fourth input pulses, respectively. After the ninth pulse, a 0 exists in storage.

The tenth input pulse produces an operation similar to that produced by the fifth, except that the flip-flop 194 is set. A signal is then developed at the output of a negative input pulser 206 connected to the reset output of the flip-flop 194. The output of the negative input pulser 206 is connected to an output terminal 207 which is connected to the input terminal 197 of the next succeeding unit, i.e., the unit for the next higher significant digit. The pulse thus applied from the output of the negative input pulser operates as a borrow pulse.

To initially store information in the flip-flops 191–194, reset and set trigger inputs thereof are connected through dual transfer circuits 211–214 to reset and set output of the flip-flops 187–190 of the intermediate storage section. A transfer signal is simultaneously applied to all four transfer circuits 211–214 from a line 215 connected to the output of an emitter follower 216 having an input connected to a terminal 217, to which a control signal is applied before initiating operation of the command pulse generating system. When desired, all of the flip-flops 191–194 may be placed in a reset condition, by application of a signal to a terminal 218 connected through a resistor 219 to inputs of all four flip-flops 191–194. Similarly, a signal may be applied to a terminal 220, connected through a resistor 221 to reset inputs of all four flip-flops 187–190 to place all of such flip-flops in a reset condition.

To supply information to the flip-flops 187–190 of the intermediate storage station, set inputs thereof are connected to the outputs of transfer units 223–226 having inputs connected through lines 227–230 to decoded outputs of the tape reader 23, respectively designated as 1, 1', 2 and 5 outputs.

A transfer signal is simultaneously applied to all four transfer units 223–226 from the output of a complementary emitter follower 231 having an input connected to the output of an OR gate 232, one input of which is connected to a terminal 233 and the other input of which is connected to the output of an AND gate 234 and also to an input of another AND gate 235. One input of the gate 234 is connected to a terminal 236 and also to the output of an AND gate 237 having inputs connected to terminals 239 and 240. A second input of the gate 234 is connected to a terminal 241.

In operation, a suitable control signal or signals are applied to terminal 236 or terminals 239 and 240 from the tape reader and associated controls, and at an appropriate time, the data insert signal is applied to the terminal 241, and thence through the gate 234, and through the emitter follower 231 to transfer information from the lines 237–240 into the intermediate storage flip-flops 187–190.

In linear interpolation, the same information is supplied to the integrand storage units 81–85 and 86–90 as applied to the end point storage units 91–95 and 96–100. For the purpose of transferring information into the integrand units, the output of the AND gate 235 is connected to a terminal 242 which is connected to the corresponding integrand unit, to cause transfer of the same information therein as applied to the intermediate storage section of the end point unit. A second input of the gate 235 is connected to a terminal 243 to which a signal is applied only during linear interpolation.

It may be noted that the set output of the intermediate storage flip-flops 187–190 are connected to ground through series capacitor and diode circuits 245–248 which provide a partial buffering action. It may also be noted that, although not only shown, output of the intermediate flip-flops 187–190, as well as outputs of the final storage flip-flops 191–194 may be coupled to suitable indicating lamps, to indicate the condition of operation thereof.

An important feature of the end point storage system, also used in the integrand register system as described below, is a zero sensing system for developing an output signal when a zero is stored in all active storage sections of the five units for each axis. In accordance with this feature, an AND gate 250 is provided having an output connected to a terminal 251 and having five inputs one of which is connected to a terminal 252. Output terminal 251 is connected to the input terminal 252 of a lower succeeding unit, i.e., the unit for the next smaller significant digit, except in the least significant digit unit, the output terminal 251 is connected to the start-stop control and end circuit 61. The other four inputs of the gate 250 are connected through inverters to set outputs of the flip-flops 190–194. In particular, one input is connected through an inverter 253 to the set output of flip-flop 191, a second input is connected to the output of the inverter 201 to set output of flip-flop 192, a third input is connected through an inverter 254 to the set output of the flip-flop 193 and a fourth input is connected through an inverter 255 to the set output of flip-flop 194.

In operation, a signal is applied to the input terminal 252 for the first unit of the storage circuit, i.e., the unit 91 in the case of the *x* end point storage circuit 63. When all four flip-flops 191–194 of that unit are reset, an output signal is developed at the output terminal 251 thereof which is applied to the input terminal 252 of the succeeding unit. Thus, when all flips-flops of the final storage sections of all units are reset, the final output is developed at the output terminal 251 of the final unit 95.

An additional feature of the end point storage unit is in the provision of a third input on the gate 200 connected to a terminal 255, to which a signal is applied to block the gate 200 during transfer of information, to prevent erratic operation which might otherwise result.

INTEGRAND REGISTER UNITS

Figure 7:
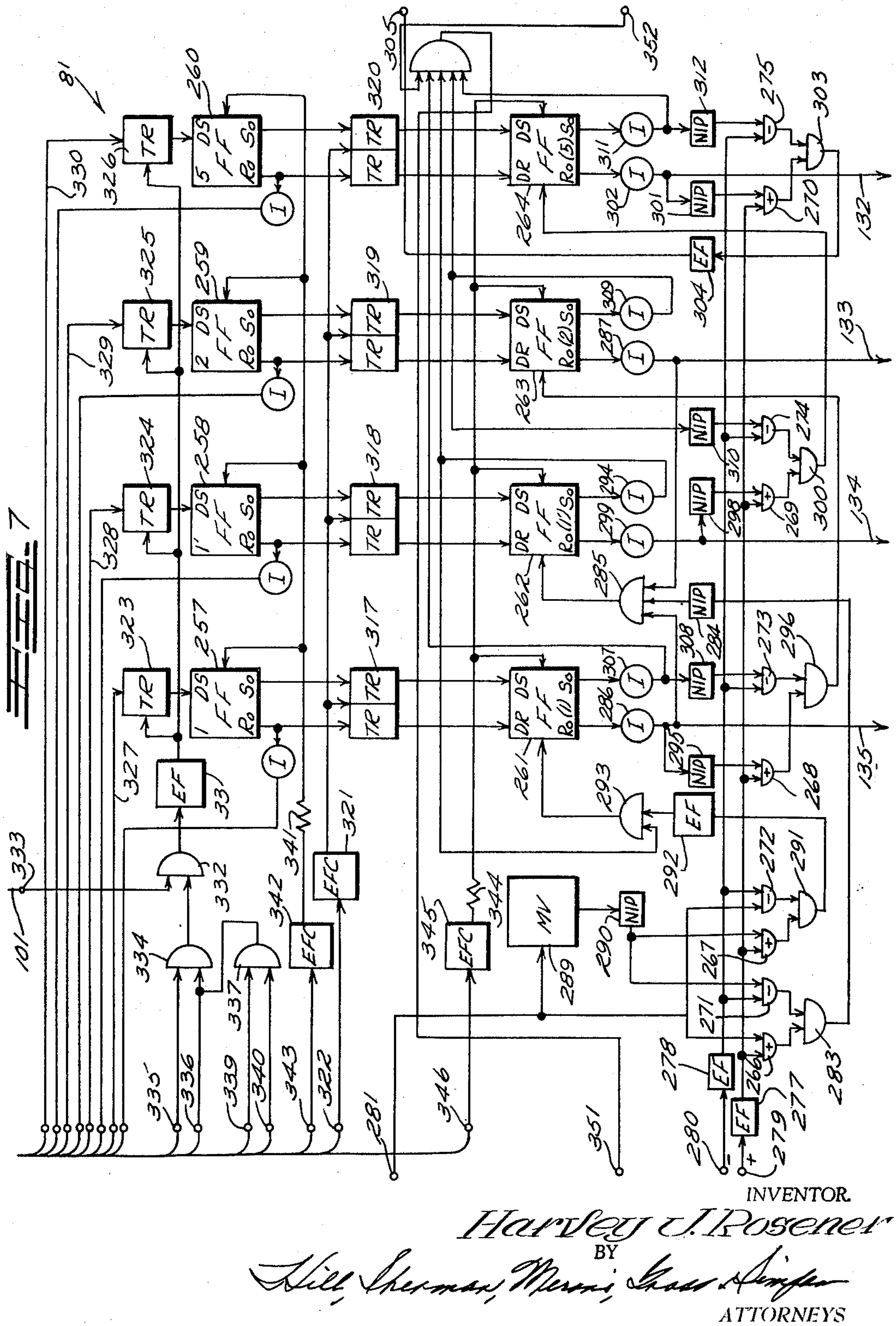
FIGURE 7 is a block diagram of one of ten integrand register units of the system.

FIGURE 7 illustrates the circuit of the integrand register unit 81, the circuits of the other units 82–90 being substantially identical thereto. In general the integrand register units operate to selectively energize the 5, 2 1′, 1 code lines 132–135 (or 137–140) to the accumulator register units, in accordance with stored information which can be serially increased or decreased.

The illustrated unit 81 is similar to the end point storage unit 91 of FIGURE 6 as described above, and comprises an intermediate or buffer storage section including four flip-flops 257–260 and a final or active storage section including four flip-flops 261–264. The intermediate storage section operates in substantially the same manner as that of the end point unit, and the final storage section also operates in generally the same manner, in storing information according to the 5, 2, 1′, 1 code, and having a storage which may be serially diminished in response to application of input pulses. However, the integrand register unit additionally incorporates circuitry for selectively increasing rather than decreasing the stored information in response to input pulses.

In particular, five "plus" gates 266–270 and five "minus" gates 271–275 are provided, inputs of such plus and minus gates being respectively connected to outputs of emitter-followers 277 and 278 having inputs connected to terminals 279 and 280.

With a signal applied to the plus terminal 279, the gates 266–270 are enabled, and application of input pulses to an input terminal 281 causes the stored number to be increased by a count of one in response to each pulse. Similarly, with the signal applied to the minus terminal 280, the gates 271 and 275 are enabled and application of each pulse to the terminal 281 reduces the stored number by a count of one.

The diminishing or subtraction operation performed with the gates 271–275 enabled, is substantially the same as that of the end point storage unit of FIGURE 6, as above described. To accommodate the addition operation with the gates 266–270 enabled, additional circuitry is provided including a plurality of negative input pulsers which permit the change between plus and minus operation without destroying the stored information.

The flip-flops 261–264 are respectively (1), (1′), (2) and (5) storage elements, operating in this respect in the same way as the flip-flops 191–194 of the end point storage units. For the addition operation, it may be assumed that flip-flops 261–264 are initially in a reset condition, so that a zero is stored, and also a "high" signal is applied to the plus terminal 279 to enable the gates 266–270.

A first input pulse applied to terminal 281 passes through the gate 266, an OR gate 283 and an emitter follower 284 to an input of a gate 285 which, however, is blocked through the connection of another input thereof through an inverter 286 to the reset output of the flip-flop 261, and it is also blocked by the connection of another input thereof through an inverter 287 to the reset output of the flip-flop 263. The first input pulse is, however, applied to the input of a monostable multivibrator 289 having an output connected to the input of a negative input pulser 290 which develops an output pulse delayed with respect to the input pulse, by a certain time interval which is preferably on the order of three microseconds. The first delayed pulse passes through the gate 267 through an OR gate 291, an emitter-follower 292 and an AND gate 293 to the binary input of the flip-flop 261 which is then switched from its reset condition to a set condition. Gate 293 is enabled by connection of a second input through an inverter 294 to the set output of flip-flop 262. A count of one is then stored.

The second input pulse from terminal 281 passes through gate 266, gate 283 and emitter-follower 284 to the gate 285 which, however, is still blocked by the connection of an input thereof through the inverter 287 to the reset output of the flip-flop 263. The second delayed pulse at the output of the negative input pulser 290 passes through the gate 267, the OR gate 291, the emitter-follower 292 and the AND gate 293 to the binary input of flip-flop 261 to reset the flip-flop 261. When flip-flop 261 is reset, an output pulse is developed at the output of a negative input pulser 295 connected to the output of the inverter 286, and the pulse so developed is applied through the gate 268 and through an OR gate 296 to the binary input of the flip-flop 263 to place the flip-flop 263 in a set condition. A count of two is then stored.

The third input pulse passes through gate 266, gate 283 and emitter-follower 284 but is blocked at gate 285 through the connection of an input thereof through an inverter 286 to the reset output of the flip-flop 261. The third delayed pulse at the output of the negative input pulser 290 passes through gate 267, gate 291, emitter-follower 292 and the gate 293 to set the flip-flop 261. It is noted that this action enables gate 285 but without any immediate effect, because of the delay obtained from the multivibrator 289 and the negative input pulser 290. At this point, a count of three is stored.

A fourth input pulse passes through gate 266, gate 283, emitter-follower 284 and the gate 285 to set the flip-flop 262 through its binary input. The fourth delayed pulse at the output of pulser 292 is the gate 293 but is blocked by the connection of an input of the gate 293 through the inverter 294 to the set output of the flip-flop 262. A count of four is then stored.

The fifth input pulse passes through gate 266, gate 283, emitter-follower 284 and gate 285 to reset flip-flop 262. The fifth delayed pulse passes through gate 267, gate 291, emitter-follower 292 and gate 293 to reset flip-flop 261. An output pulse is then developed by the negative input pulser 295 which passes through gate 268 and gate 296 to reset the flip-flop 263. When flip-flop 262 is reset in response to the fifth input pulse as above described, a signal is developed at the output of a negative input pulser 298, connected through an inverter 299 to the reset output of the flip-flop 262. The pulse so developed is applied through the AND gate 269 and an OR gate 300 to the binary input of the flip-flop 264, to set flip-flop 264. Thus flip-flops 261, 262 and 263 are reset, while flip-flop 264 is set, and a count of five is stored.

The sixth, seventh, eighth and ninth input pulses perform operations similar to those performed by the first, second, third and fourth pulses respectively.

The tenth pulse produces an operation similar to that of the fifth input pulse but is different in that the flip-flop 264 is reset. When flip-flop 264 is reset, an output pulse is developed by a negative input pulser 301, connected through an inverter 302 to the reset output of the flip-flop 264, and is applied through AND gate 270, an OR gate 303 and an emitter-follower 304 to an output terminal 305 which is connected to the input terminal 281 of the next unit. The pulse so applied operates as a carry pulse in the addition operation. In the subtraction operation, a borrow pulse is developed at the terminal 305.

With respect to the subtraction operation, reference is made to the foregoing discussion of the operation of the end point storage unit of FIGURE 6. With the minus gate 271–275 enabled by application of a signal to the input terminal 280, the connection of circuit component is substantially the same as that described above. It is noted that for such operation, the set output of the flip-flop 261 is connected through an inverter 307 to a negative input pulser 308, the signal being developed at the output of the pulser 308 when the flip-flop 261 is set. Similarly, the set output of the flip-flop 263 is connected through an inverter 309 to a negative input pulser 310 connected to the gate 274, and the set output of the flip-flop 264 is connected through an inverter 311 to a negative input pulser 312 connected to an input of the gate 275. When the flip-flops 263 and 264 are set, corresponding signals are developed at the outputs of the pulsers 310 and 312.

It is noted that the lines 132–135 are respectively connected to the outputs of the inverters 302, 287, 299 and 286 connected to the reset outputs of the flip-flops 264, 263, 262 and 261 are high when the respective flip-flops are set.

Reset and set inputs of the flip-flops 261–264 are connected to dual transfer circuits or units 317–320 having inputs connected to reset and set outputs of the flip-flops 257–260. The transfer signal is applied to the units 317–320 from a complementary emitter-follower 321 connected to an input terminal 322. Set inputs of the flip-flops 257–260 are connected to transfer units 323–326 having inputs connected to (1), (1′), (2) and (5) data input lines 327–330 from the coded tape reader. A transfer pulse is applied to the unit 323–326 from a complementary emitter-follower 331 having an input connected to the output of an OR gate 332 having a first input connected to an input terminal 333 and a second input connected to the output of a gate 334 having a first input connected to a terminal 335 and a second input connected to a terminal 336 and also to the output of a gate 337 having inputs connected to terminals 339 and 340.

Reset inputs of the flip-flops 257–260 are connected through a resistor 341 to the output of a complementary emitter-follower 342 having an input connected to a terminal 343. Similarly, reset outputs of the flip-flops 261–264 are connected through a resistor 344 to the output of a complementary emitter-follower 345 having an input connected to a terminal 346.

In operation, a reset signal may be applied to terminal 346 to place the final storage flip-flops 261–264 in a reset condition. A transfer pulse may then be applied to the terminal 332 to transfer to the flip-flops 261–264 information which was previously stored in the flip-flops 257–260. A reset signal may then be applied to the terminal 343 to reset the flip-flops 357–360 and suitable signals may be applied from the tape reader to the terminal 336 or to the terminals 339 and 340, after which a data insert signal may be applied to the terminal 335 to cause operation of the transfer units 323–326 and to store information applied from the lines 327–330.

In linear interpolation, as discussed above, the same information is applied to the integrand unit as applied to the end point storage units, and terminals 333 of each integrand unit may be connected to the terminal 242 of the corresponding end point storage unit. Thus, data inputs 327–330 may be connected in parallel with the data inputs 227–330.

The integrand unit of FIGURE 7 incorporates a zero sensing system similar to that of the end point storage unit of FIGURE 6. In particular, a gate 350 is provided having an output connected to a terminal 351 and having five inputs, one of which is connected to a terminal 352. The other four inputs of the gate 330 are connected to the output of the inverter 307, to the output of the inverter 294, to the output of the inverter 309 and to the output of the inverter 311, to develop an output at the terminal 351 when an input signal is applied to the terminal 352 and when all four of the flip-flops 261–264 are reset. Input terminal 352 is connected to the output terminal 351 of the next higher significant unit, or to a signal source in the case of the first unit, an output terminal 351 of the final unit is connected to the start-stop control and end point correction circuit 61.

SERIAL PARALLEL ADDITION OPERATION

Figure 8:
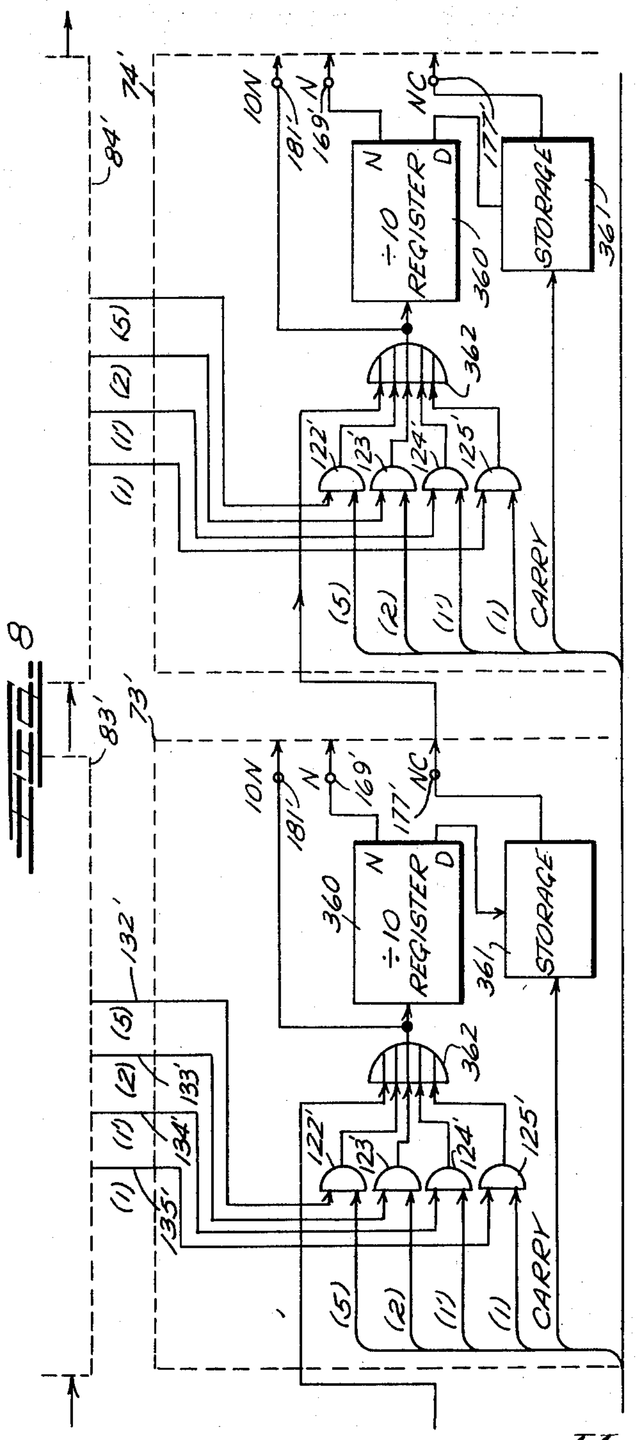
FIGURE 8 is a simplified showing of portions of two accumulator register units of the system and their connection to corresponding integrand registers, to illustrate the serial-parallel addition operation of the system.

Before considering the switching circuitry used for obtaining various modes of operation of the system, it is important to have a clear understanding of the serial-parallel addition operation of the operational integrators. Such operation may be clarified by FIGURE 8 which is a simplified showing of $i$ portions 73′ and 74′ of the accumulator registers 73 and 74, and their relationship to the corresponding integrand registers.

As shown, each of the register units 73′ and 74′ comprises a divide-by-ten register or decade 360, corresponding to the decade formed by flip-flops 111 and 114 and multivibrators 119 and 151 in the circuit of FIGURE 4. An N or normal output of the register 360 is applied to the N output terminal 169′, corresponding to the terminal 169 in FIGURE 4. A D or delayed output of the register 360 (corresponding to the delayed output of multivibrator 161) is applied to a storage circuit 361 which corresponds to the flip-flop 173 and negative input pulser 175 of FIGURE 4, the output thereof being applied to a NC or normal controlled carry output terminal 177'.

The input of the register 360 is connected to the output of an OR gate 362 (corresponding to a gate in the input of multivibrator 119 in FIGURE 4), inputs of the gate 362 being connected to the normal carry or NC output from the preceding unit, and to AND gates 122'–125', corresponding to gates 122–125 of FIGURE 4. Inputs of the gates 122'–125' are connected through lines 132'–135' to the corresponding integrand unit 83, and inputs to the gates 122'–125' are also connected to (5), (2), (1') and (1) lines from the pulse code unit 76, a carry line from the pulse code unit being connected to the storage circuit 361.

To illustrate the operation, assume that the pulse code unit starts from a reset condition, that the integrand unit 83' has a seven stored therein representing a weighted value of a segment of the integrand of 0.07 inch, that the integrand unit 84 has a four stored representing a weighed value of a segment of the integrand of 0.40 inch, that the unit 73' has a count of eight stored in its register 360, representing a weighted sum of 0.08 inch and that the accumulator unit 74' has a count of five stored in its register 360, representing a weighed sum of 0.5 inch in storage.

In response to the first nine pulses from the pulse code unit 76, the seven of the unit 83' would be added serially to the eight in the register 360 of the unit 73', to create a sum of fifteen. Since the sum exceeds the capacity of the register 360, a one or a carry would be stored in the storage unit 361, with a five stored in the register 360. At the same time, the four stored in the integrand unit 84' would be added serially to the five stored in the register 360 of the unit 74' to create a sum of nine which would be stored in the register 360 of the unit 74'.

When the tenth or carry pulse is then applied from the pulse code unit 76, the five would remain stored in the register 360 of the unit 73' while the carry pulse in the storage 361 would be released to be applied to the register 360 of the unit 74'. The register 360 of the unit 74' would then change from a nine to a zero, and a carry would be applied from the delayed output of the storage 361 of the unit 74'.

During the carry pulse, the number stored in the integrand 83' might be changed by a signal from the preceding integrand unit. Assuming, however, that the same numbers are stored, the following conditions would exist after ten additional pulses from the pulse code unit 76, i.e., after an additional cycle of operation thereof. The unit 73' would have a count of two stored in the register 360 thereof, with no carry pulse stored, the unit 74' would have received four serial pulses during the addition cycle and one controlled carry pulse from the storage 361 of the unit 73', and a controlled carry would be received in the next succeeding unit. Including that carry, the new sum in the accumulator register would be 1.52 inches, which is the sum of the total of 0.58 inch initially stored in the units 73' and 74', and the value of 0.47 inch stored in the integrand units 83 and 84', and added twice to the stored value of 0.58 inch during two cycles of operation of the pulse code unit.

SWITCHING CIRCUITS

Switching circuitry is provided in the feedback switching circuit 65 and also in the signal switching and combining circuit 43 for obtaining various modes of operation of the system. Before describing such circuits in detail, the principal modes of operation will be described with reference to FIGURES 9–14 which show schematically the primary circuit connections.

Figure 9:
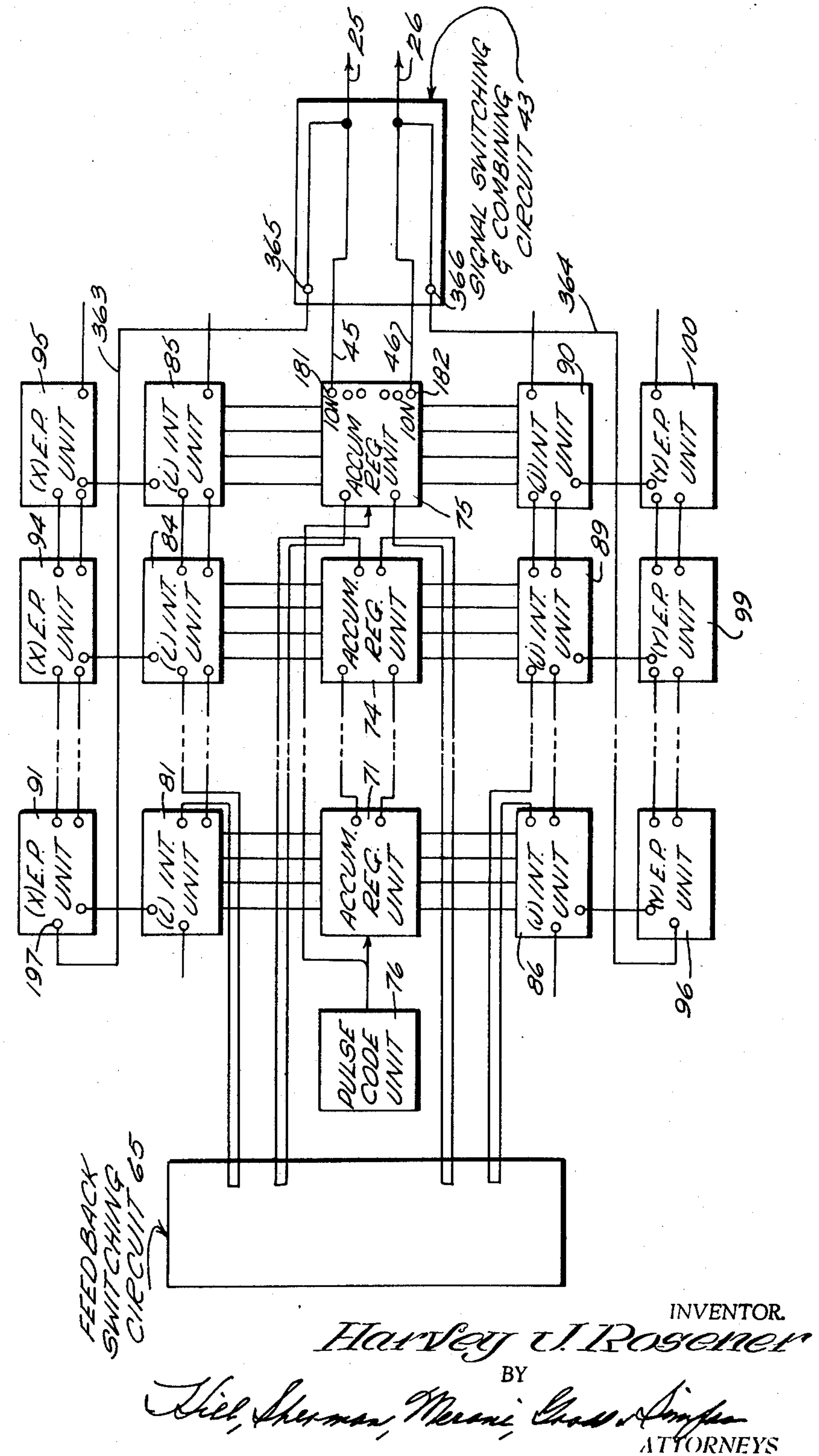
FIGURE 9 shows primary circuit connections for normal linear operation of the operational integrators.
Figure 10:
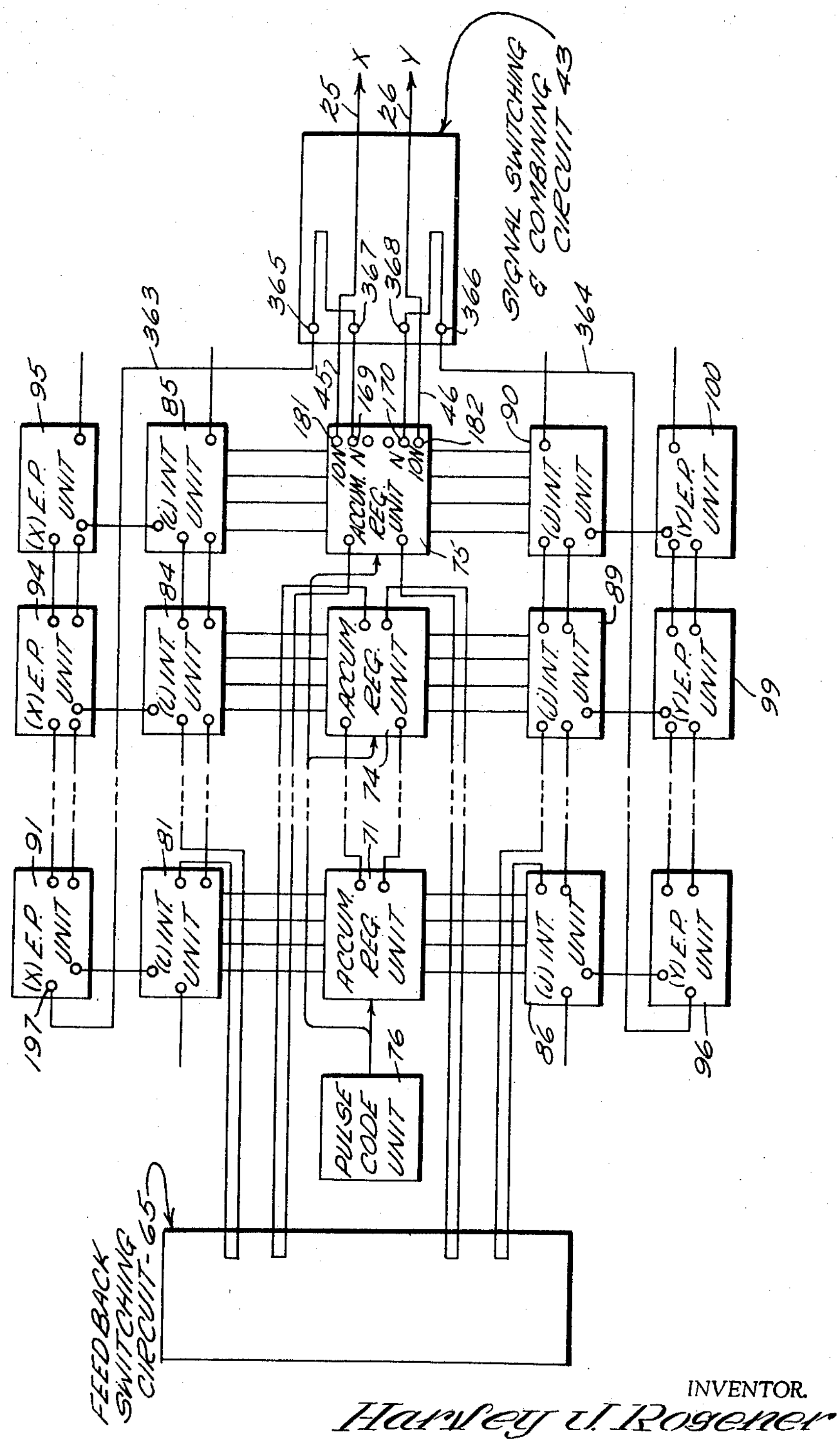
FIGURE 10 shows the primary circuit connections for long dimension linear operation of the integrators.
Figure 11:
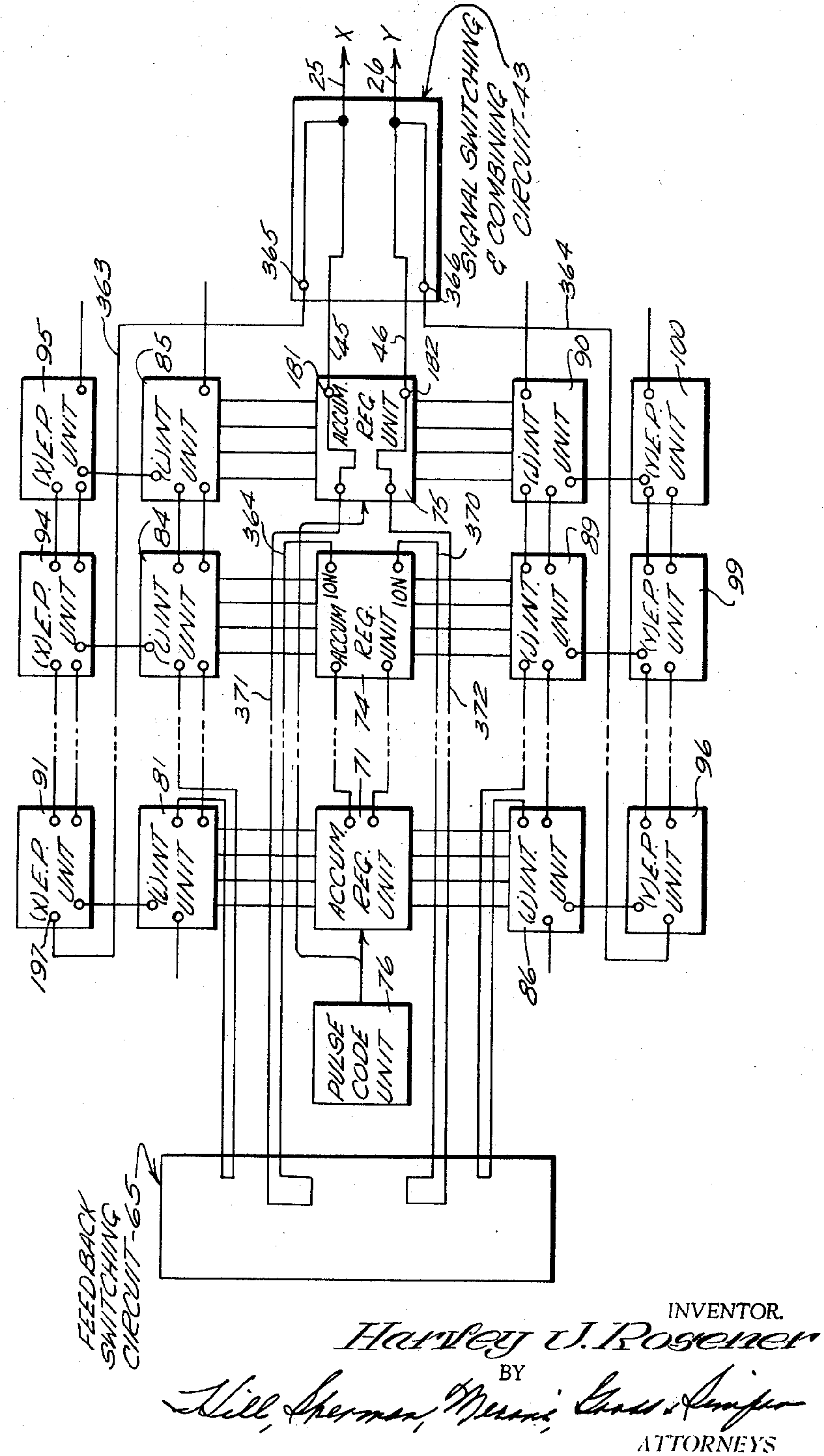
FIGURE 11 shows the primary connections for short dimension linear operation of the integrators.
Figure 12:
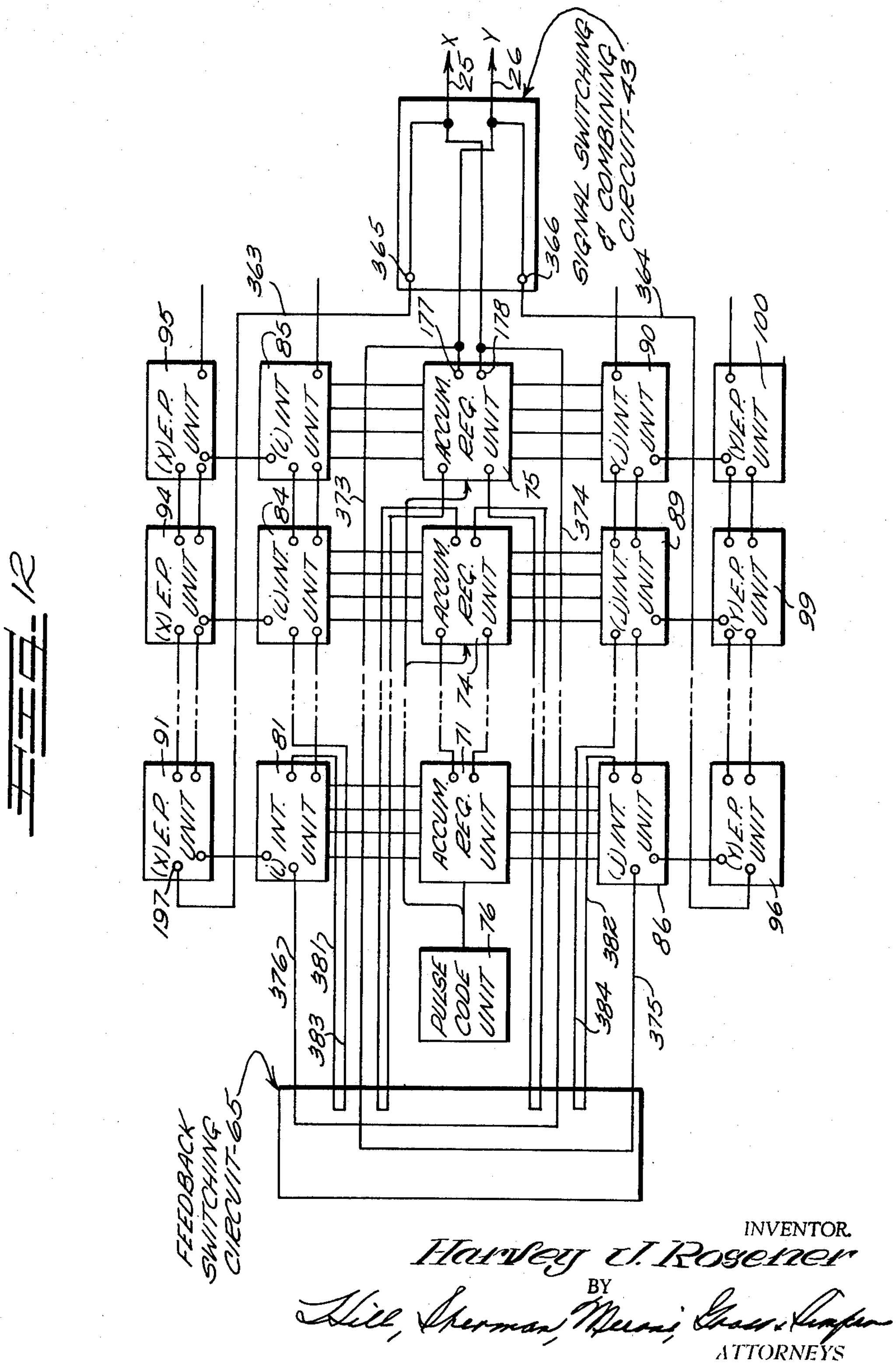
FIGURE 12 shows the primary circuit connections for normal circular interpolation operation of the integrators.
Figure 13:
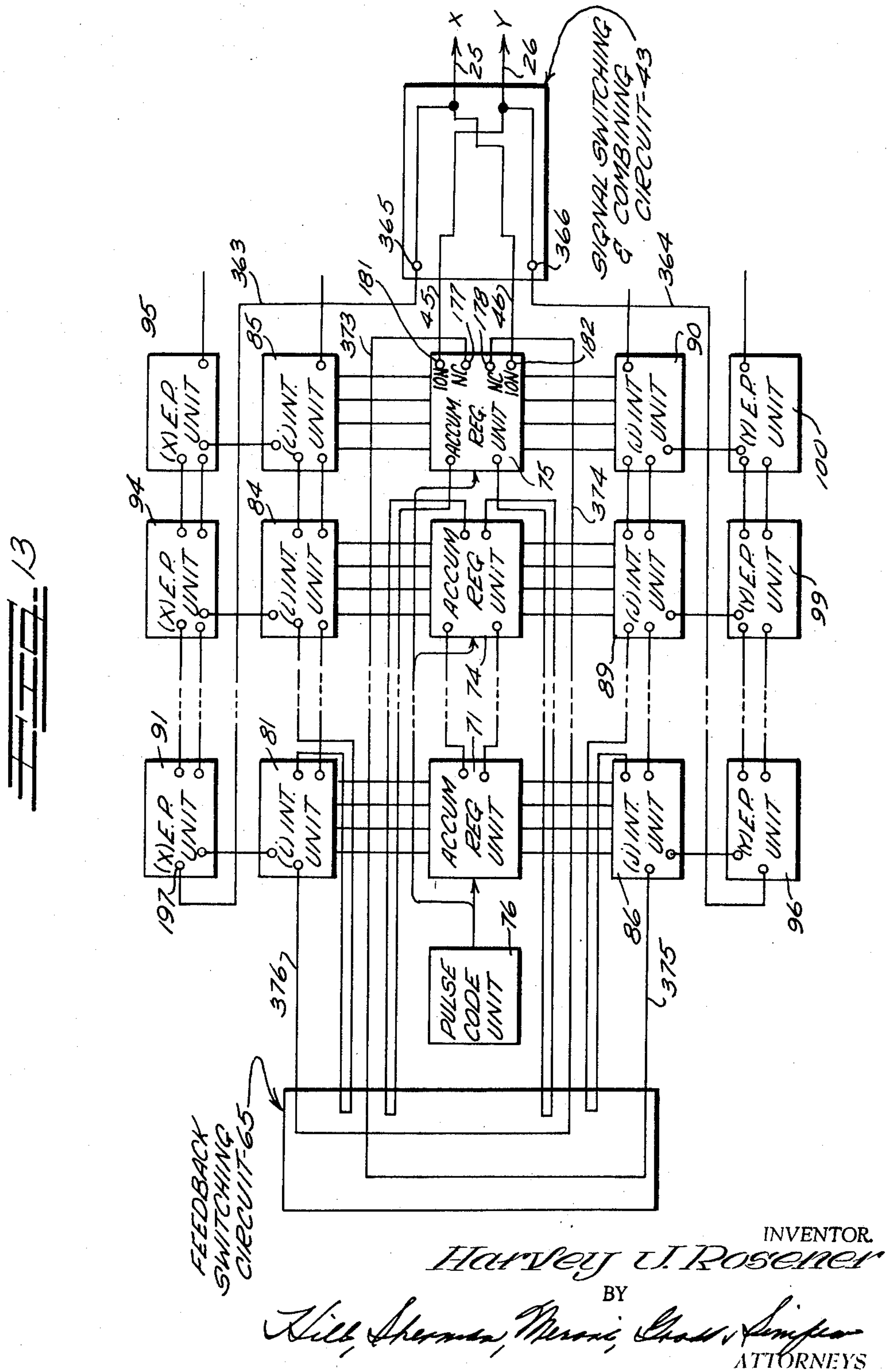
FIGURE 13 shows the primary circuit connections for long radius circular interpolation operation of the integrators.
Figure 14:
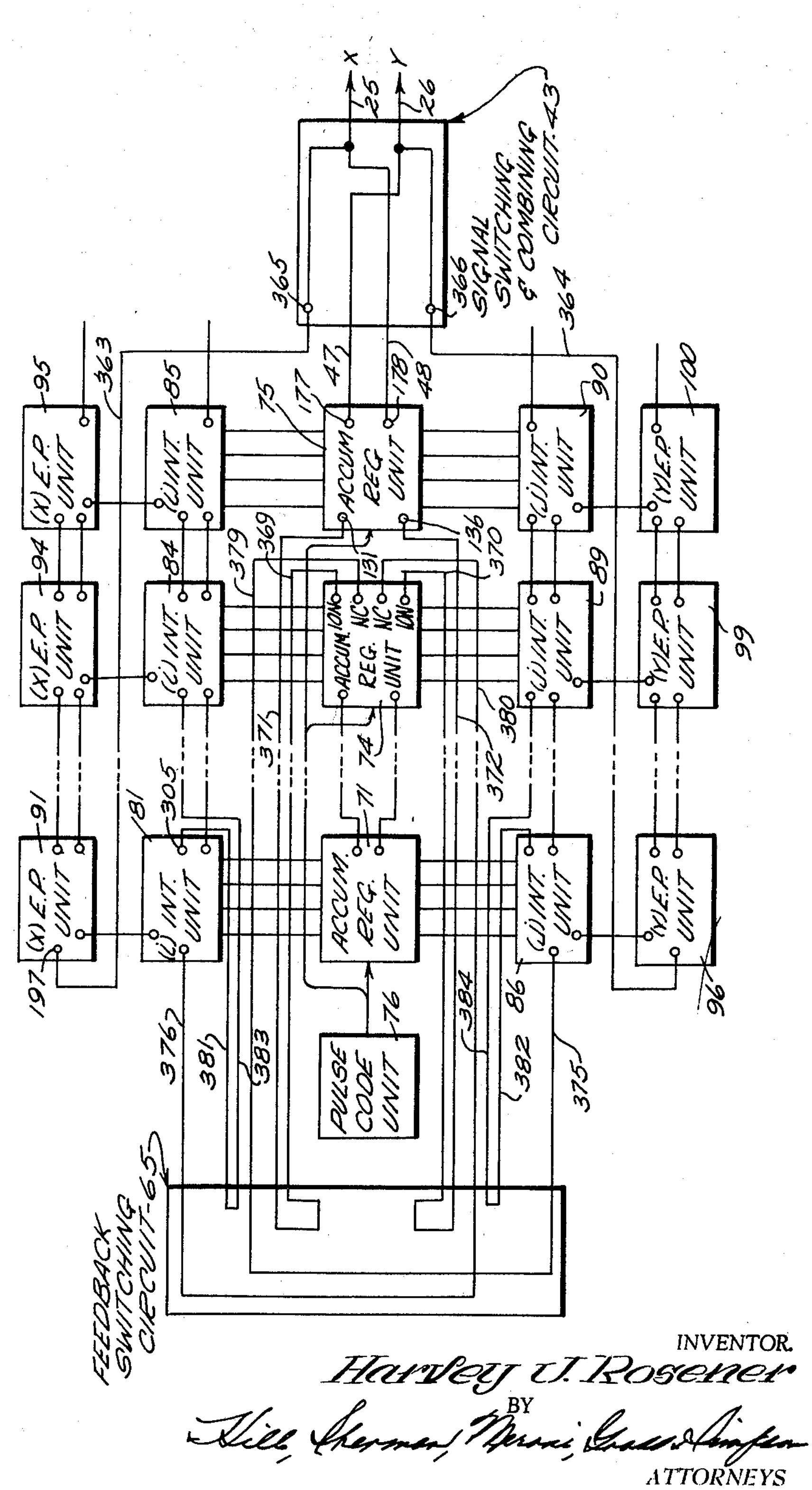
FIGURE 14 shows the primary circuit connections for short radius circular interpolation operation of the integrators.

In particular, FIGURE 9 shows the connections for normal linear operation; FIGURE 10 shows the connections for long dimension linear operation; FIGURE 11 shows the connections for short dimension linear operation; FIGURE 12 shows the circuit connections for normal circular interpolation; FIGURE 13 shows the circuit connections for long radius circular interpolation; and FIGURE 14 shows the circuit connections for short radius circular interpolation.

Such illustrated modes of operation are referred to herein as accuracy modes, but it is here noted that other modes of operation referred to as velocity modes, are possible with the illustrated system.

Referring to FIGURE 9, which shows the circuit connections for normal linear interpolation, input terminal 197 of the *x* end point unit 91 and the corresponding input terminal of the *y* end point unit 96 are respectively connected through lines 363 and 364 to terminals 365 and 366 of the signal switching and combining circuit 43, terminals 365 and 366 being connected internally by suitable gates in the circuit 43 to output lines 25 and 26 respectively. Output lines 25 and 26 are also connected through gates in the circuit 43 to lines 45 and 46 which are connected to the 10 N output terminals 181 and 182 of the final accumulator register unit 75.

In this mode of operation, output or command pulses are produced at constant rates dependent upon the numbers stored in the *i* and *j* integrand registers. The maximum rate on either line 25 or 26 is substantially equal to the rate of supply of pulses to the input of the pulse code unit 76. Since the numbers stored in the integrand units are not changed during operation, linear movement is obtained. The movement is terminated when pulses have been developed on the respective lines equal in numbers to the numbers stored in the end point registers. With five units in each register, and with each pulse being productive of 0.0001 inch in movement, the maximum movement along each axis is 9.9999 inches.

FIGURE 10 shows the connections for long dimension linear operation. As shown, the 10 N terminals 181 and 182 of the final accumulator register unit 75 are connected to the output lines 25 and 26 through the circuit 43, which is the same as for normal linear interpolation operation as illustrated in FIGURE 9. However, the terminals 365 and 366 are connected by gates within the signal switching and combining circuit 43 to terminals 367 and 368 which are connected to the N output terminals 169 and 170 of the final accumulator register unit.

With such connections, and assuming the same rate of supply of pulses to the pulse code unit 76, and the same numbers being stored in the integrand registers, the output or command pulses are produced at the same rates as in the normal linear interpolation operation. However, the operation is continued for ten times as long, due to the count down provided by the decades of the final accumulator register unit 75 which, in effect, are disposed ahead of the first end point units 91 and 96.

With this mode of operation, accordingly, and again assuming that each pulse produces a movement of 0.0001 inch, the maximum movement along axis is 99.999 inches.

FIGURE 11 shows connections for short dimension linear interpolation operation. In such operation, digits are not entered into the final *i* and *j* integrand units 85 and 90 or the final end point units 95 and 100. As shown, the terminals 365 and 366 and also the lines 45 and 46 are connected to the *x* and *y* output lines 25 and 26 which is the same as in the normal linear interpolation operation as shown in FIGURE 9. However, the 10 N output terminals of the accumulator register unit 74 are connected through lines 369 and 370 to the feedback switching circuit 65 and through gates therewithin to lines 371 and 372 which are connected to the input terminals of the final accumulator register unit 75.

In the final accumulator register unit 75, as diagrammatically illustrated in FIGURE 11, and as also illustrated in FIGURE 4, the input terminals 131 and 136 are effectively connected directly to the 10 N output terminals 181 and 182 through the gates 121 and 126, the multivibrators 119 and 120 and the emitter followers 183 and 184. Thus, in effect, the 10 N output terminals of the accumulator register unit 74 are connected to the x and y lines 25 and 26.

The maximum rate of generation of the pulses in the short linear interpolation operation is the same as that for the normal and long dimension operation, i.e. substantially equal to the rate of supply of pulses to the pulse code unit. The maximum amount of movement is, however, reduced by a factor of 10, due to the fact that no information is stored in the last end point units 95 and 100.

FIGURE 12 shows the connections for normal circular interpolation operation. In such operation, terminals 365 and 366 are connected to the output lines 25 and 26, and it may here be noted that such connections are also made for long radius and short radius circular interpolation as shown in FIGURES 13 and 14.

For normal circular interpolation as shown in FIGURE 12, the NC output terminals 177 and 178 are connected through the lines 47 and 48 and through gates in the circuit 43 to the output lines 26 and 25, respectively. In addition, such NC output terminals 177 and 178 of the final accumulator register unit are connected through lines 373 and 374 to the feedback switching circuit 65 and through gates therein to lines 375 and 376 which are respectively connected to the input terminals to the j and i integrand units 86 and 81.

With such cross connections, the pulses are initially generated on the x and y output lines at rates dependent upon the numbers initially stored in the j and i integrand registers. As the pulses are generated, they are fed back to the opposite integrand units in a manner to serially modify the same, either in an additive or a subtractive direction, dependent upon sign signals applied to the integrand register units. In any event, the pulses are generated at such respective rates as to cause movement in a circular path. Assuming a movement of 0.0001 inch for each pulse, the maximum radius of a circle that can be generated is 9.9999 inches, in the normal circular interpolation operation.

It is noteworthy that it is found that the number of pulses which must be supplied into the input of the pulse code unit to complete one quadrant is $\pi/2\times10^6$ pulses (approximately 1,570,800), and is independent of the radius. With this feature, the system can measure angles in radiant units with a high degree of accuracy.

FIGURE 13 shows the connections for long radius circular interpolation. In such operation the NC terminals 177 and 178 of the final accumulator register unit 75 are connected through lines 373 and 374, gates within the feedback switching unit 65 and the lines 375 and 376 to the inputs of the j and i integrand units 86 and 81, respectively, which is the same as in normal circular interpolation as illustrated in FIGURE 12. However, the 10 N output terminals 181 and 182 of the final accumulator register unit 75 are connected through the lines 45 and 46 and through gates within the circuit 43 to the output lines 26 and 25, respectively.

With such connections, the angular velocity of operation of the system is the same, but ten times as many pulses are produced at the output lines 25 and 26, as compared to the normal circular interpolation operation of FIGURE 12. Accordingly, the maximum radius that might be produced is 99.9990 inches, the actual radius being equal to the value as determined from the information stored in the integrand registers, multiplied by ten.

The maximum velocity is also increased by a factor of ten, for any assumed rate of supply of pulses to the pulse code unit.

Such long radius circular interpolation operation does, however, produce certain errors, and in accordance with an important feature of this invention, the error compensation circuit 54 is provided, as described hereinbelow.

FIGURE 14 shows the circuit connections for short radius circular interpolation. The NC output terminals 177 and 178 of the final accumulator register unit 75 are connected through the lines 47 and 48 and through gates in the circuit 43 to the y and x output lines 26 and 25, respectively. The 10 N output terminals of the unit 74 are connected through the lines 369 and 370, which are connected through gates in the feedback switching circuit 65 to the lines 371 and 372, connected to the input terminals 131 and 136 of the final accumulator register unit 75. The NC output terminals of the unit 74 are connected through lines 379 and 380 to the feedback switching circuit 65 and through gates therein to the lines 375 and 376, so as to be connected to the inputs of the integrand units 86 and 81, respectively.

The circular interpolation modes of operation as illustrated in FIGURES 12 and 14 are representative, but other modes of circular interpolation are possible with the system as illustrated. In this connection, it is noted that as shown in FIGURES 12–14, the output terminal 305 of the first integrand unit 81 and the corresponding output terminal of the integrand unit 86 are connected through lines 381 and 382 to the feedback switching circuit 65 and through connections therewith to lines 383 and 384 which are connected to the input terminals of the succeeding integrand units. It is possible to increase the effective annular velocity of operation of the system by applying feedback pulses to the input of the second integrand units, rather than to the inputs of the first integrand units. For example, the normal circular interpolation operation as shown in FIGURE 12 may be changed by disconnecting the lines 373 and 374 from the lines 375 and 376, and connecting the lines 373 and 374 to the lines 384 and 383, respectively. With this change, a mode of operation referred to herein as a velocity mode is obtained, the modes of operation depicted in FIGURES 9–14 being referred to herein as accuracy modes.

FEEDBACK SWITCHING CIRCUIT 65

Figure 15:
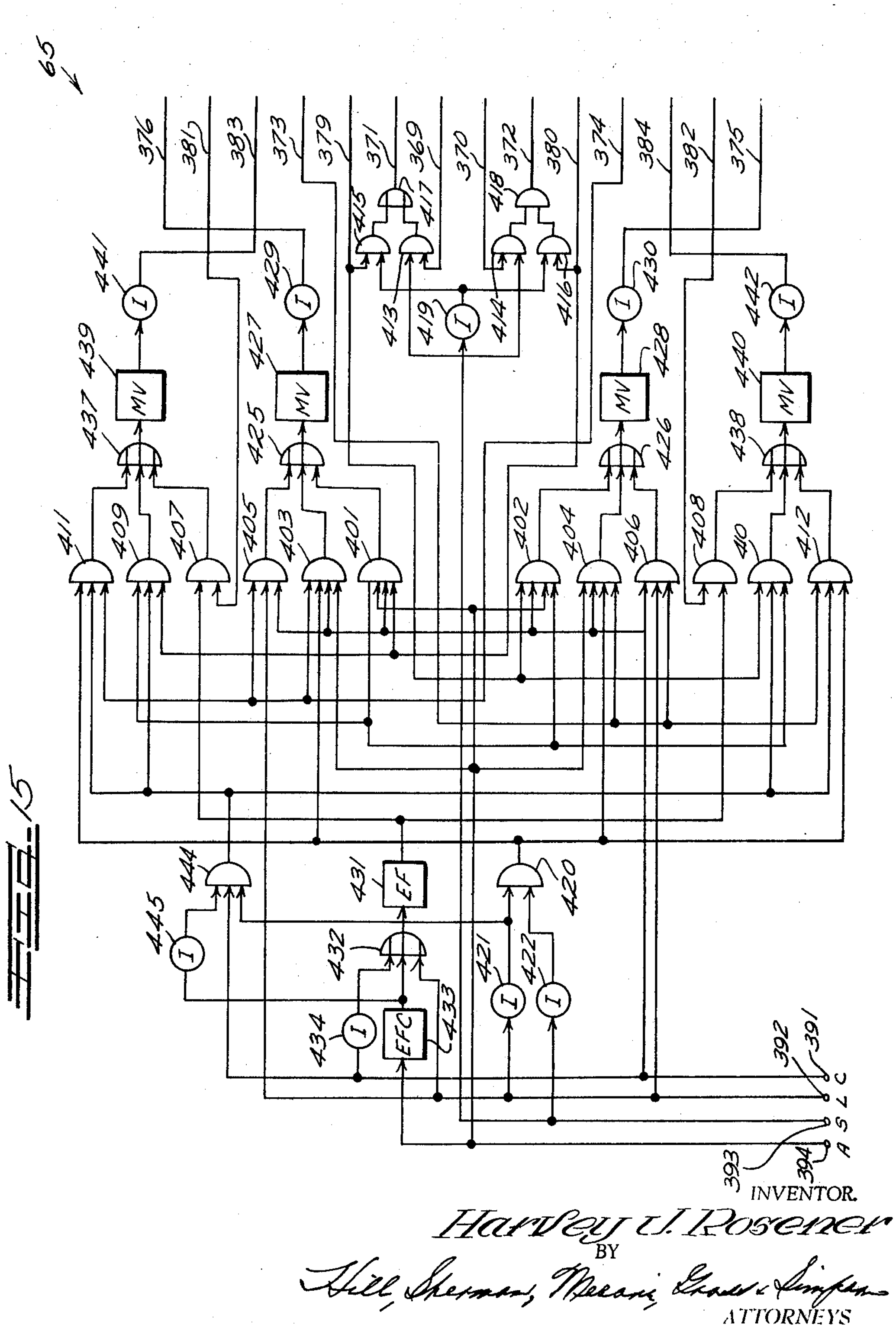
FIGURE 15 is a block diagram of a feedback switching circuit of the system.

FIGURE 15 is a diagram of the feedback switching circuit 65. The circuit has four control signal input terminals 391–394 connected to the operation mode control circuit 66. Terminal 391 is energized or is "high" for circular interpolation. Terminal 392 is high for long dimension or long radius operation and terminal 393 is high for short dimension or short radius operation. When both are low, normal operation takes place. Terminal 394 is high for accuracy modes of operation and is low for velocity modes of operation.

The operation of a plurality of gates 401–416 is selectively controlled by energization of one or more of the terminals 391–394 to obtain the various modes of operation as described above.

For normal linear interpolation as illustrated in FIGURE 9, and for long dimension linear interpolation as illustrated in FIGURE 10, no feedback interconnections are required in the feedback switching circuit 65, except that the illustrated circuit provides an interconnection between the NC output terminals of the accumulator register unit 74 and the input terminals of the final accumulator register unit 75. As illustrated in FIGURE 15, the lines 379 and 380, which are connected to the NC output terminals of the fourth accumulator register unit 74, are coupled through AND gates 415 and 416 and OR gates 417 and 418 to the lines 371 and 372 which are connected to the input terminals of the final accumulator register unit 75. Gates 415 and 416 are enabled from the output of an inverter 419 having an input connected to the short dimension terminal 393, gates 415 and 416 being thus enabled except when the terminal 393 is high.

For short dimension linear interpolation, when the terminal 393 is high, gates 415 and 416 are disabled from the output of the inverter 419, while gates 413 and 414 are enabled to connect the 10 N output terminals of the fourth accumulator register unit 74 through lines 369 and 370, the gates 413 and 414, the gates 417 and 418 and the lines 371 and 372 to the input terminals of the final accumulator register unit 75.

For normal circular interpolation, as illustrated in FIGURE 12, the gates 403 and 404 are enabled from a signal applied thereto from the circle terminal 391, a signal applied thereto from the accuracy terminal 394, and from the lack of signals applied to the long and short terminals 392 and 393, inputs to the gates 403 and 404 being connected to the output of an AND gate 420 having inputs connected through inverters 421 and 422 to the terminals 392 and 393. The outputs of gates 403 and 404 are respectively applied through OR gates 425 and 426 to multivibrators 427 and 428 connected through inverters 429 and 430 to the lines 376 and 375, respectively. With gates 403 and 404 thus enabled, the lines 373 and 374, connected to the NC output terminals 177 and 178 of the final accumulator register unit 75 are connected through the gates 404 and 403 to the inputs of multivibrators 428 and 427 to develop signals which are applied through the inverters 430 and 429 to the terminals 375 and 376.

Also during normal circular interpolation, the gates 407 and 408 are enabled through the connection of inputs thereof to the output of an emitter follower 431 having an inlet connected to the output of an OR gate 432, one input of the gate 432 being connected through a complementary emitter follower 433 to the accuracy terminal 394. Other terminals of the OR gate 432 are connected through an inverter 434 to the terminal 391 and through a direct connection to the terminal 392, but such connections are not effective during normal circular interpolation in which the terminals 391 and 394 are high while the terminals 392 and 393 are low.

With gates 407 and 408 enabled, pulses from the output of the first integrand units 81 and 86 are applied through the lines 381 and 382 and through the gates 407 and 408 to OR gates 437 and 438 to the inputs of multivibrators 439 and 440 having outputs connected through inverters 441 and 442 to the lines 383 and 384 which are connected to the inputs of the second integrand units 82 and 87.

For long radius circular interpolation as illustrated in FIGURE 13, the gates 405 and 406 shown in FIGURE 15 are enabled by the application of signals from the circle terminal 391 and the long terminal 393. Signals are then applied from the lines 373 and 374 through the gates 406 and 405 and through the gates 426 and 425 to the inputs of multivibrators 428 and 427, the outputs thereof being applied through the inverters 430 and 429 to the lines 375 and 376, respectively.

For short radius circular interpolation, the gates 401 and 402 are enabled by signals from the circle, short and accuracy terminals 391, 393 and 394. Lines 379 and 380 are then connected through the gates 402 and 401 and through gates 426 and 425 to the inputs of multivibrators 428 and 427, the outputs of which are applied through inverters 430 and 429 to the lines 375 and 376. In addition, lines 369 and 370 are connected through gates 413 and 414 and gates 417 and 418 to the lines 371 and 372, to thus connect the 10 N output terminals of the unit 74 to the input terminals of the unit 75.

Gates 409–412 are operative in the velocity mode of operation, inputs thereof being connected to the output of an AND gate 444 having a first input connected through an inverter 445 to the output of the complementary emitter-follower 433, a second input connected to the terminal 391 and a third input connected to the output of the inverter 421. Thus as a prerequisite to operation of the gates 409–412, it is necessary that the accuracy terminal 394 be low, that the long terminal 392 be low and that the circle terminal 391 be high.

When the short terminal 393 is also low, the gates 411 and 412 are enabled and signals are applied from the lines 373 and 374, connected to the NC output terminals of the final unit 75, through the gates 412 and 411 and through the gates 438 and 437 to the inputs of the multivibrators 440 and 439, the outputs of which are applied through inverters 442 and 441 to lines 384 and 383. Under such conditions, the connections are the same as illustrated in FIGURE 12, except that the lines 372 and 374 are thus effectively connected to the lines 384 and 383 to be connected to the inputs of the second integrand units 87 and 82.

When the accuracy terminal 394 is low, the short terminal 393 is high, the long terminal 392 is low and the circle terminal 391 is high, a short radius velocity circular interpolation takes place, the gates 409 and 410 being enabled to apply signals from the NC output terminals of the fourth accumulator register unit 74 through lines 379 and 380 and through the gates 410 and 409, and gates 438 and 437 to the inputs of multivibrators 440 and 439, the outputs of which are applied through inverters 442 and 441 to lines 384 and 383.

SIGNAL SWITCHING AND COMBINING CIRCUIT 43

Figure 16:
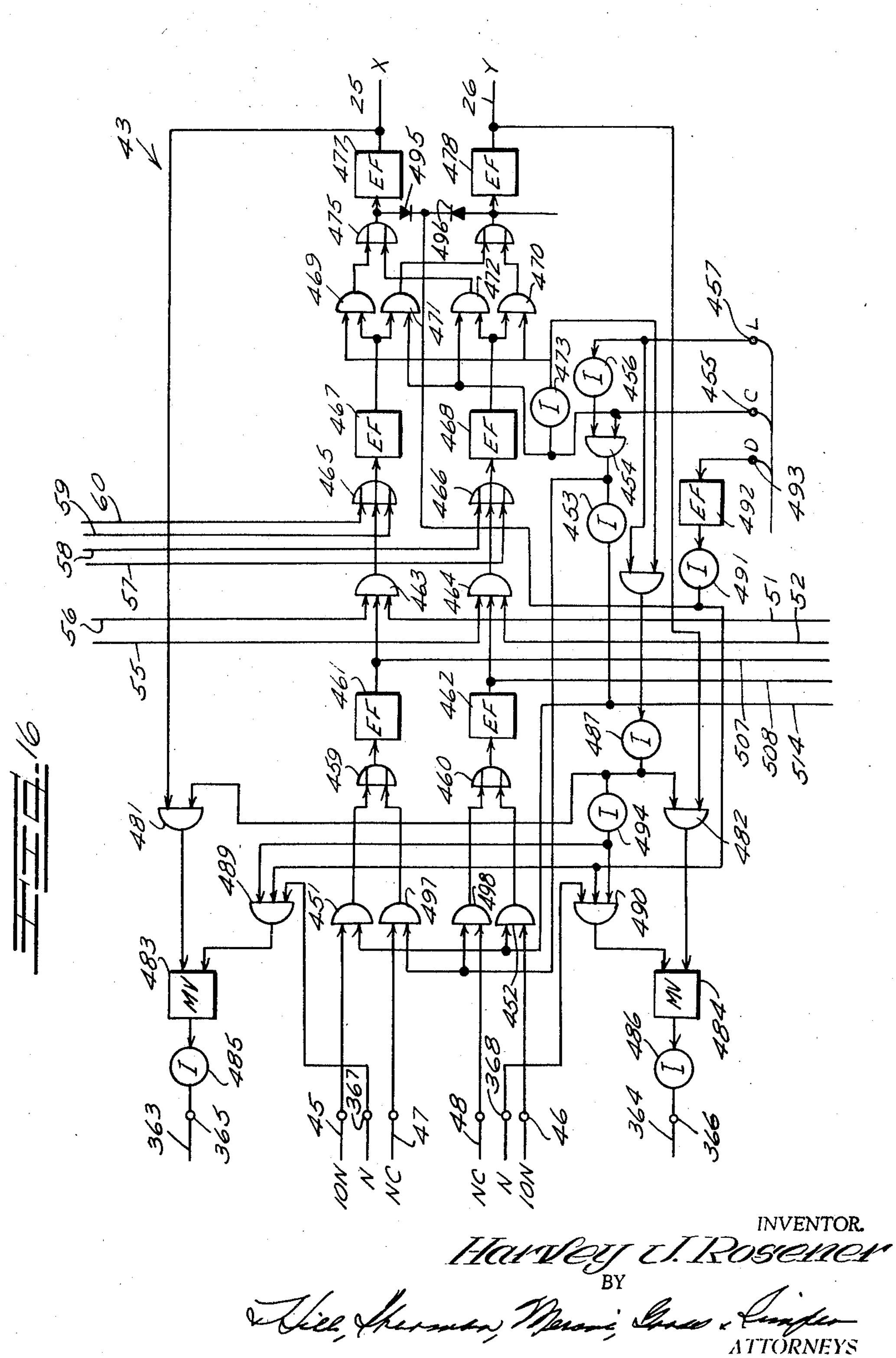
FIGURE 16 is a block diagram of a signal combining and switching circuit of the system.

FIGURE 16 shows the arrangement of the signal switching and combining circuit 43 which connects selected outputs of the final accumulator register unit 75 to the lines 25 and 26 and also provides connections to the lines 363 and 364, connected to the input terminals of the first end point units 91 and 96. The circuit 43 also includes gates controlled through lines 51 and 52 from the error compensation circuit 54, to delete pulses at certain times during long radius circular interpolation, to correct errors which might otherwise result. Further, the circuit 43 includes gates for feeding additional pulses through lines 57–60 from the start-stop control and end point compensation circuit 61, to insure that a programmed end point will be reached.

Considering first the normal linear interpolation operation, as depicted in FIGURE 9, pulses from the 10 N terminals 181 and 182 of the final accumulator register unit 75 are fed through the lines 45 and 46 to gates 451 and 452. Gates 451 and 452 are enabled from the output of an inverter 453 connected to the output of an AND gate 454 having one input connected to a terminal 455 and another input connected through an inverter 456 to a terminal 457. Signals are applied to the terminals 455 and 457 to obtain circle and long dimension operation, respectively. With the circle terminal 455 low, i.e. for linear interpolation, the output of the gate 454 is low and the output of the inverter 453 is high to enable the gates 451 and 452.

With gates 451 and 452 enabled, pulses are applied through OR gates 459 and 460 to emitter followers 461 and 462 having outputs connected to inputs of AND gates 463 and 464.

As hereinafter described, one or both of the gates 463 and 464 may be disabled for error compensation or during endpoint correction, but normally both are enabled from signals applied on lines 51, 52, 55 and 56. The outputs of the gates 463 and 464 are applied through OR gates 465 and 466 to the inputs of emitter followers 467 and 468 having outputs connected to inputs of AND gates 469 and 470 and also to inputs of AND gates 471 and 472. During linear interpolation, the gates 469 and 470 are enabled by a signal applied from an output of an inverter 473 having an input connected to the circle input terminal 455. With gates 469 and 470 enabled, pulses are applied through OR gates 475 and 476 to inputs of emitter followers 477 and 478 having outputs connected to the lines 25 and 26.

Also during normal linear interpolation, a pair of gates 481 and 482 are enabled to connect the lines 25 and 26 to the inputs of multivibrators 483 and 484 having outputs connected through inverters 485 and 486 to the terminals 365 and 366 which are connected through the lines 363 and 364 to the input terminals of the first end point units 81 and 86. Gates 481 and 482 are enabled through the connection of inputs thereof to the output of an inverter 487 having an input connected to the output of an AND gate 488. One input of the AND gate 488 is connected to the long dimension terminal 457, while the other input thereof is connected to the output of the inverter 473. Thus with the long dimension terminal 457 low, the input to the inverter 487 is low and the output thereof is high to enable the gates 481 and 482.

For long dimension linear operation, as depicted in FIGURE 10, the gates 451 and 452 are again enabled to connect the 10 N terminals 181 and 182 of the final accumulator register unit 75 to the output lines 25 and 26, which is the same for normal linear interpolation operation. However, the gates 481 and 482 are disabled, both inputs to the control gate 488 being high to make the output of the inverter 487 low. Pulses are, however, applied from the N output terminals 169 and 170 of the final accumulator register units to terminals 367 and 368 which are connected through gates 489 and 490 to inputs of the multivibrators 483 and 484, to thereby develop pulses at the terminals 365 and 366 connected through lines 363 and 364 to the inputs of the first end point units 91 and 96. Gates 489 and 490 have inputs connected to the output of an inverter 491 having an input connected through a complementary emitter-follower 492 to a terminal 493 which is normally low, but which may be made high by a dwell signal. The dwell signal thus disables the gates 489 and 490 and also clamps or blocks the inputs of emitter-followers 477 and 478 through a pair of diodes 495 and 496 connected to the output of inverter 491.

Additional inputs to the gates 489 and 490 are connected to the output of an inverter 494 having an input connected to the output of the inverter 487 which as above indicated is low during long dimension circular interpolation.

For short dimension linear interpolation, the connections are the same as described above for normal linear interpolation.

For normal circular interpolation operation, the gates 481 and 482 are again enabled to cause transmission of pulses from the output terminals 365 and 366 in response to pulses developed on the output lines 25 and 26. It may here be noted that gates 481 and 482 are also enabled for long radius and short radius circular interpolation.

However, for normal circular interpolation, the NC output terminals 177 and 178 of the final accumulator register unit 75 are connected through the lines 47 and 48 to the inputs of a pair of gates 497 and 498 which are enabled through the connection of inputs thereof to the outputs of the AND gate 454, the output of the AND gate 454 being high when the circle terminal 455 is high and when the long dimension terminal 457 is low.

With gates 497 and 498 enabled, pulses are applied through gates 459 and 460, emitter followers 461 and 462, gates 463 and 464, gates 465 and 466 and emitter followers 467 and 468 to the inputs of gates 469 and 470 and also gates 471 and 472. At this time, gates 469 and 470 are disabled and gates 471 and 472 are enabled, the circle terminal 455 being high and the output of the inverter 473 being low. Thus a reverse switching takes place with pulses being respectively applied from input lines 47 and 48 to the output lines 26 and 25, respectively.

For long radius circular interpolation, as depicted in FIGURE 13, gates 451 and 452 are enabled and gates 471 and 472 are enabled, to connect the 10 N output terminals 181 and 182 of the final accumulator register unit 75 to the output lines 26 and 25, respectively.

For short radius circular interpolation, as depicted in FIGURE 14, the operation in the circuit 43 is the same as in normal circular interpolation operation.

ERROR COMPENSATION CIRCUIT

Figure 17:
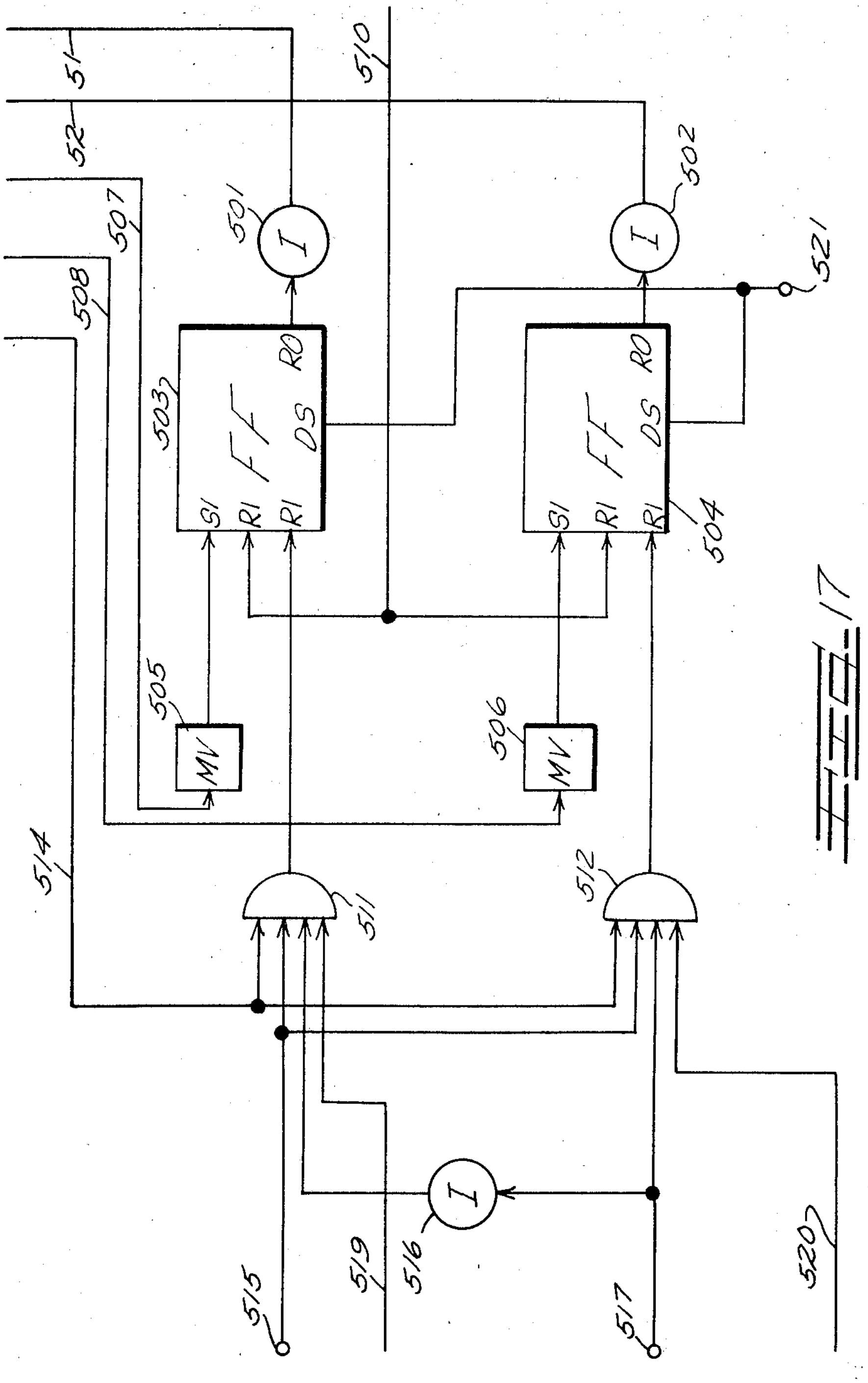
FIGURE 17 is a block diagram of an error compensation circuit of the system.

FIGURE 17 illustrates the error compensation circuit 56 which through the lines 51 and 52 controls the gates 463 and 464 of the signal switching and combining circuit 43, to delete pulses at certain times during long radius circular interpolation, to correct errors which would otherwise result.

With long radius circular interpolation, using the connections as illustrated in FIGURE 13, there is a known 0.001 inch error, i.e. one extra axis pulse for each 10 inches of radius information, and the circuit 54 operates to delete or substract one pulse each time the positive integrand increases by ten inches. If the rotation is clockwise, the compensation takes place in the *x* axis channel while if the rotation is counterclockwise, the compensation is in the *y* axis channel.

In particular, the lines 51 and 52 are respectively connected to the outputs of inverters 501 and 502 having inputs connected to the reset outputs of flip-flops 503 and 504. Set inputs of the flip-flops 503 and 504 are connected to the outputs of monostable multivibrators 505 and 506 having inputs connected to lines 507 and 508 which, as illustrated in FIGURE 16 are connected to the outputs of emitter followers 461 and 462 of the circuit 43. A first pair of reset inputs of the flip-flop 503 and 504 are connected together into a line 510 which is connected to the start-stop control and end point correction circuit 61.

A second pair of reset inputs of the flip-flops 503 and 504 are connected to the outputs of gates 511 and 512 having a first pair of inputs connected together and through line 514 to the output of inverter 453 in the circuit 43, a second pair of inputs connected together and to a terminal 515 which is energized for circular interpolation, a third pair of inputs connected to the output and input of an inverter 516, the input of the inverter being connected to a terminal 517 which is energized for clockwise rotation, and a fourth pair of inputs connected to lines 519 and 520. As shown in FIGURE 3, lines 519 and 520 are connected to the outputs of the fourth *j* and *i* integrand units 89 and 84, respectively.

The flip-flops 503 and 504 additionally have drive set inputs connected together and to a terminal 521 to which a signal may be applied at the beginning of a cycle of operation.

With flip-flops 503 and 504 set, prior to the beginning of a cycle, a signal is thereafter applied on line 510 from the circuit 61, immediately after the beginning of a cycle. The flip-flops 503 and 504 are then reset and the outputs of the inverters 501 and 502 are both low to disable both of the gates 463 and 464 in the circuit 43, The first pulse applied from the output of the emitter follower 461 through line 507 causes multivibrator 505 to operate to apply a delayed pulse to the flip-flop 503 to set the flip-flop 503, whereupon the reset output thereof goes low, and the output of the inverter 501 goes high to enable the gate 463 after the pulse has diminished in level. The next succeeding pulse passes through the gate 463 in circuit 43, thus one pulse is delated from the *y* channel (terminal 26 of circuit 43). The operation of the flip-flop 504 is similar.

With a long dimension signal applied to terminal 457 in FIGURE 16, the output of the inverter 456 is low, the output of the gate 454 is low and the output of the inverter 453 is high to apply a high signal on the line 514. The terminal 515 is high during circular interpolation, the output of the inverter 516 is high for counterclockwise rotation. Accordingly, the first pulse on line 519 from the output of the fourth *j* integrand unit 89 passes through the gate 511 to reset the flip-flop 503 whereby the output of the inverter 501 goes low to disable the gate 463. However, the next succeeding pulse from the output of the flip-flop 461, applied through line 507, sets the flip-flop late, so that it is deleted. Subsequent pulses applied on line 519 operate to deleate one pulse from the *y* channel (terminal 26 of circuit 43). The operation of flip-flop 504 is similar, during clockwise rotation.

With this arrangement, the operation is accurate to within one pulse during long radius circular interpolation.

START-STOP CONTROL AND END POINT CORRECTION CIRCUIT 61

Figure 18:
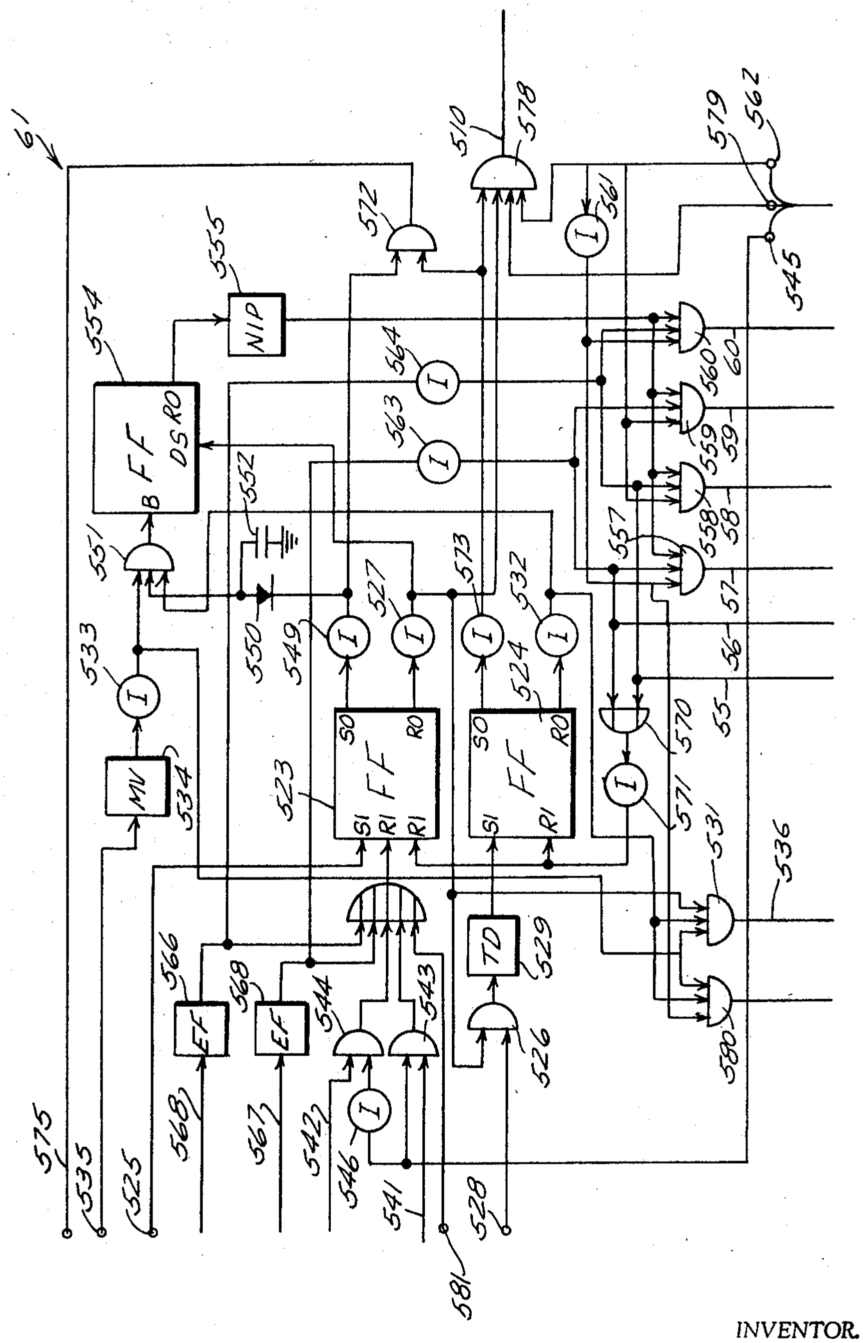
FIGURE 18 is a block diagram of a start-stop control and end point correction circuit of the system.

Referring to FIGURE 18, the circuit 61 comprises first and second flip-flops 523 and 524 which are both reset at the beginning of a cycle of operation of the system. The set input of the flip-flop 523 is connected to a terminal 525 to which a signal is applied from the feed rate generator circuit 62, which is a delayed signal following transfer of information read from tape, from intermediate or buffer storage to final or active storage. Flip-flop 523 is then set and a gate 526 is enabled, an input of the gate 526 being connected to an output of an inverter 527 having an input connected to the reset output of the flip-flop 523. With gate 526 enabled, a first pulse applied to a terminal 528 may pass therethrough. Terminal 528 is connected to the feed rate generator 62, to receive synchronized pulses therefrom.

The pulses passing through gate 526 are delayed by a time delay circuit 529 and are applied to the set input of the flip-flop 524 to set the same (synchronized with the feed rate generator).

With both flip-flops 523 and 524 set, a gate 531 is enabled, one input thereof being connected to the output of the inverter 527 and second input thereof being connected to the output of an inverter 532 having its input connected to the reset output of the flip-flop 524. A third input of the gate 531 is connected to an output of an inverter 533 having its input connected to the output of a multivibrator 534, the input of the multivibrator 534 being connected to a terminal 535.

Terminal 535 is connected to an output of the feed rate generator 62 to receive pulses at a frequency rate, such pulses being then applied through multivibrator 534, inverter 533 and gate 531 to a line 536 which is connected to the input of the pulse code unit 76. The system then operates to develop command pulses on the lines 25 and 26, such pulses being also applied to the diminishing end point storage circuits 63 and 64, it being noted that in long dimension linear interpolation, the pulses are applied to the inputs of the end point storage circuits at a rate which is $\frac{1}{10}$ the rate of the command pulses.

The operation then continues until an output signal is developed by either the *x* end point storage circuit 63 or the *y* end point storage circuit 64, or, in the case of circular interpolation, when an output is developed by either the *i* integrand register of the *j* integrand register. It is here noted that the illustrated system is not designed to permit a programmed movement to take place in more than one quadrant. Accordingly, operation of the operational integrators is stopped when either of the integrand registers reaches zero, even through the programmed end point has not been reached.

As a first specific example of the operation of the stopping and end point correction circuit, it may be assumed that a circular interpolation operation has been programmed, but with an end point programmed which is outside the quadrant of operation. Either the *i* or the *j* integrand register will then reach zero, whereupon a signal is applied on either a line 541 or a line 542, line 541 being connected to the output terminal 351 of the least *i* integrand unit 81, and line 542 being connected to the output of the least or final *j* integrand unit 86.

If the signal is developed on the line 541, a gate 543 connected thereto will necessarily be enabled and another gate 544 connected to the line 542 will necessarily be disabled. This is so because of the connection of the input of the gate 543 to a terminal 545 which is high during clockwise operation, wherein the *i* integrand is diminishing toward zero. Terminal 545 is connected to the input of an inverter 546 having an output connected to the gate 544, which is thus operative during counterclockwise rotation.

Assuming clockwise rotation, and a programmed end point outside the quadrant of operation, a signal applied on line 541 from the output of the *i* integrand register will pass through the gate 543 and through an OR gate 548 to a reset input of the flip-flop 523, which is then reset. A signal is then developed at the output of an inverter 549 connected to the set output of the flip-flop 523, and the signal so developed is applied through a diode 550 to an input of a gate 551. A capacitor 552 connected between the anode of the diode 550 and ground, provides a slight delay, sufficient to prevent gate 551 from being enabled until the second pulse thereafter applied from the output of the inverter 533. Also note that upon resetting flip-flop 523 at the output of an inverter 527 connected to the reset output of flip-flop 523 having an output to disable gate 531 thereupon stopping the pulse train to the pulse code unit 76.

The second and following pulses from the inverter 533 are, however, applied through the gate 551 to the binary input of a flip-flop 554 having a reset output connected to the input of a negative input pulser 555. In response to the third, fifth and subsequent odd pulses applied from the inverter 533, following reset operation of the flip-flop 523, pulses are applied from the output of the negative input pulser 555 to four gates 557–560 having outputs connected to the lines 57–60.

In this example, the gates 557 and 560 will be disabled, inputs thereof being connected to the output of an inverter 561 having an input connected to a terminal 562 which is high for circular interpolation operation. However, one or both of the gates 558 and 559 may be enabled, inputs thereof being connected directly to the circular terminal 562, and other inputs thereof being connected to the outputs of inverters 563 and 564 having inputs connected to outputs of emitter followers 565 and 566. The inputs of the emitter followers 565 and 566 are connected to lines 567 and 568 which are respectively connected to outputs of the y and x end point circuits 64 and 63.

Assuming, for example, that neither end point circuit has reached zero when an integrand register has reached zero, the outputs of the inverters 563 and 564 will be high to enable both of the gates 558 and 559. Pulses are then applied from the output of the negative input pulser 55 through the gates 558 and 559 and through lines 58 and 59 to the OR gates 466 and 465 in the circuit 43 of FIGURE 16. Thus pulses will be developed on both output lines 25 and 26 at the same rate, and movement will take place along a 45° angle.

Assume further that the *x* end point register reaches zero before the *y* end point register reaches zero. The output of the inverter 564 then goes low to disable the gate 58 and thereby discontinue application of pulses on the *x* line 25. At the same time, line 55 goes low to disable gate 464. Pulses are still applied on the *y* line 26 and when the *y* end point register reaches zero, the output of the inverter 563 goes low to disable gate 59 and also disable gate 463 through line 56, to discontinue application of pulses on the *y* line 26.

The outputs of the inverters 563 and 564 are additionally applied through an OR gate 570 to the input of an inverter 571 having an output connected to the rest inputs of the flip-flops 523 and 524. When the outputs of both inverters 563 and 564 are low, the output of the inverter 571 is high to reset in flip-flop 524, flip-flop 523 having been already reset in the example under consideration. When both flip-flops 523 and 524 are thus reset, a signal is developed at the output of an AND gate 572 having one input connected to the output of the inverter 549 and having a second input connected to the output of an inverter 573, the input of which is connected to the set output of the flip-flop 524. The signal thus developed at the output of the AND gate 572 is a "cycle complete" signal which is applied through a line 575 to the tape reader 23.

Accordingly, with a programmed end point outside the quadrant of programmed movement in a circular path, the operation of the operational integrators is stopped when the movement reaches the limit of the quadrant whereupon pulses are applied to both lines 25 and 26 to cause movement along a 45° angle. When the end point is satisfied with respect to one coordinate, movement then continues along the other coordinate until the end point is reached.

The foregoing example is the most complex, and other examples that might be given are simplified versions. Two other examples might be mentioned, however.

In circular interpolation, if the $x$ line 568 goes high before the $y$ line 567 goes high and before the $i$ and $j$ lines 541 and 542 go high, the flip-flop 523 is reset in the manner as described above, to cause application of pulses to the flip-flop 554 and the generation of pulses at the output of the negative input pulser 555, at a rate equal to one-half the rate of application of pulses to the terminal 535. Such pulses from the output of the negative pulse 55 are applied through the gate 559 to the line 59, to be developed on the $y$ line 26. The movement then takes place along the $y$ axis until the $y$ end point is reached whereupon the outputs of both inverters 563 and 564 are low, and a reset signal is applied from the output of an inverter 571.

As another example, assume linear interpolation wherein gates 557 and 560 have high signals applied thereto from the output of the inverter 561. When the $x$ end point register develops an output signal, for example, the flip-flop 523 is set in the manner as described above, to cause the development of pulses at the output of the negative input pulser 555, and the output of the inverter 564 is low while the output of the inverter 563 remains high, so that gate 557 is enabled, and the pulses are applied to line 57. As shown in FIGURE 16, line 57 is connected to the input of the OR gate 466 so that such pulses are then applied on the $y$ line 26, and continue until the $y$ end joint register develops an output signal.

It is noted that the line 510 which is connected to the error compensation circuit 54 to reset flip-flops 503 and 504 at the beginning of a cycle, is connected to the output of an AND gate 578 having a first input connected to the circular terminal 562, a second input connected to a terminal 579, to which a long dimension signal is applied, a third input connected to the output of the inverter 527 and a fourth input connected to the output of the inverter 573. With this arrangement, an output signal is developed on the line 510 when the flip-flop 523 is initially set at the beginning of a cycle, in long radius circular interpolation.

The circuit 61 additionally has an auxiliary gate 580 having inputs connected to the output of the inverter 561, the output of the inverter 532, and the output of the inverter 533. The output of the gate 580 may be connected to a contour generator, and a carry pulse from the contour generator may be applied to an input terminal 581 connected to an input of the OR gate 548.

OPERATIONAL MODE CONTROL 66

Figure 19:
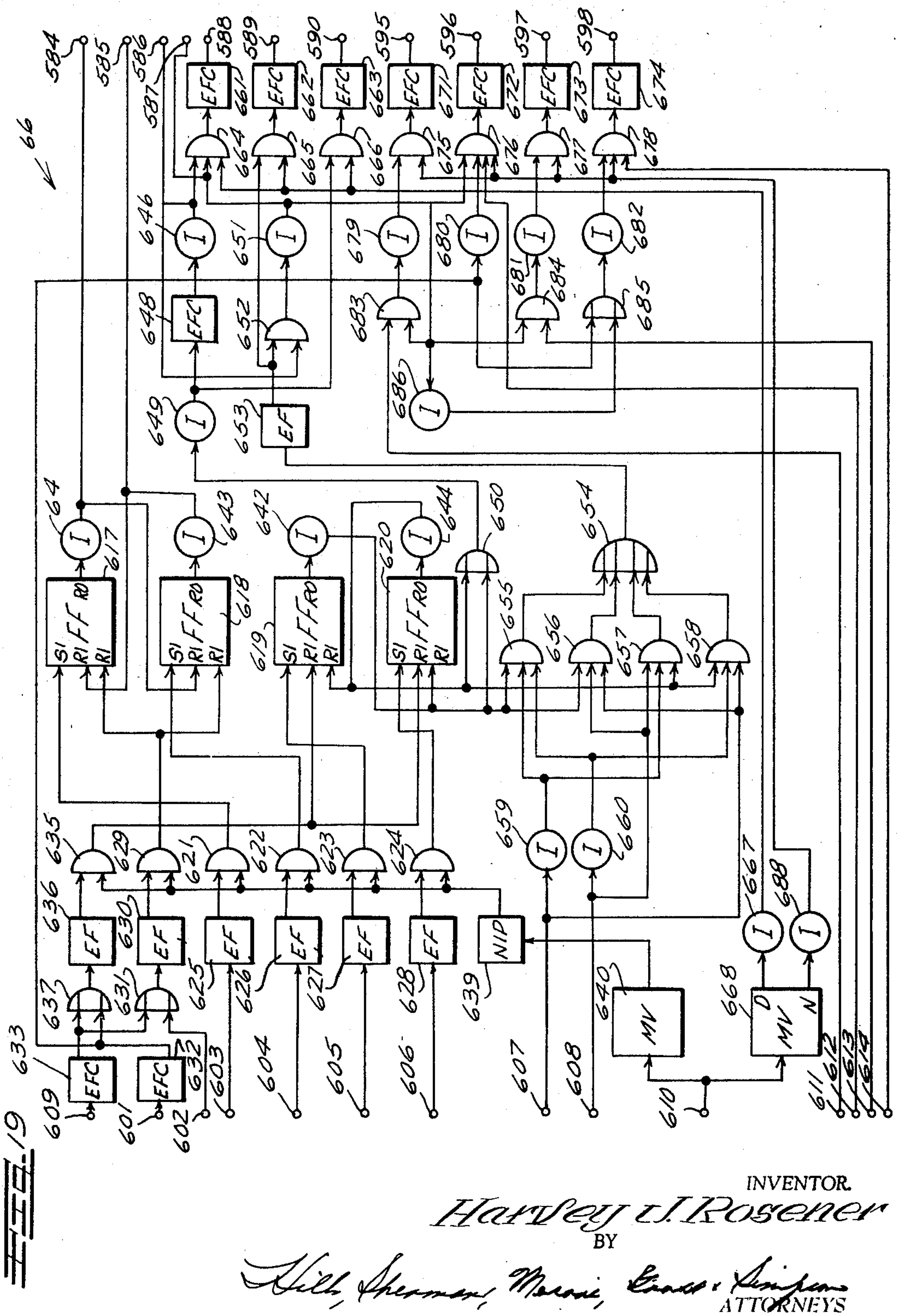
FIGURE 19 is a block diagram of an operation mode control circuit of the system.

FIGURE 19 illustrates the operation mode control circuit 66. In general, the circuit provides an active memory for various circular words, encodes the proper sign information for the integrand registers and developes signals for application to the various circuits, to obtain the proper setup. The memory feature is provided, to permit other preparatory $g$ codes to exist along with circular or linear words, and particularly to permit programmed acceleration and/or deceleration with circular interpolation.

In particular, the circuit 66 has short, long, circle and CW terminals 584, 585, 586 and 587, respectively, which are connected to terminals of the signal switching and combining circuit 43 (circle terminal 455 and long terminal 457), terminals of the error compensation circuit 54 (circle terminal 515 and CW terminal 517), terminals of the start-stop control and end joint point correction circuit 61 (CW terminal 545, circle terminal 562 and long terminal 579), and terminals of the feedback switching circuit 65 (terminals 391–394).

The circuit additionally has CW, CCW and linear output terminals 588, 589 and 590 which are connected to terminals 591, 592 and 593 of each of the dual channel accumulator register units 71–75, to obtain proper setup thereof, as further described hereinbelow in connection with FIGURE 4.

Further, the circuit 66 has output terminals 595, 596, 597 and 598 which are, respectively, $i$ plus, $j$ plus, $j$ minus and $i$ minus terminals. The $i$ plus and $i$ minus terminals 595 and 598 are connected to terminals 279 and 280 of each of the $i$ integrand units (see FIGURE 7), and the $j$ plus and $j$ minus terminals 596 and 597 are connected to like input terminals of each of the $j$ integrand units 86–90.

The circuit 66 additionally has input terminals 601–608 which are connected to the output of the storage circuit 68. A linear signal is applied to terminal 601, a normal signal to terminal 602, a short signal to terminal 603, a long signal to terminal 604, a counterclockwise signal to terminal 605, a clockwise signal to terminal 606, an $x$ plus signal to terminal 607 and a $y$ plus signal to terminal 608.

Input terminals 609 and 610 are connected to the tape reader, an initial reset storage signal being applied to terminal 609, and a signal being applied to terminal 610 upon transfer from intermediate to active storage.

Additional input terminals 611–614 are connected to the thread cutting control circuit 69.

Four flip-flops 617–620 are provided in the circuit 66 for storage purposes. The set inputs of the flip-flops 617–620 are respectively connected to the outputs of gates 621–624 having inputs connected to the outputs of emitter followers 625–628, the inputs of which are respectively connected to the short, long, CCW and CW terminals 603–606. Reset inputs of the flip-flops 617 and 618 are connected to the output of a gate 629 having an input connected to the output of an emitter follower 630, the input thereof being connected to the output of an OR gate 631 having one input connected to the terminal 602 and a second input connected to the output of an emitter follower 632, the input of which is connected to the terminal 609.

Reset inputs of the flip-flops 619 and 620 are connected to the output of a gate 635 having an input connected to the output of an emitter follower 636 having an input connected to the output of an OR gate 637 having inputs connected to the outputs of the emitter followers 632 and 633.

Inputs of all of the gates 621–624, 629 and 635 are connected to the output of a negative input pulser 639 having an input connected to the output of a multivibrator 640, the input of which is connected to the terminal 610.

In operation, when a pulse is applied to terminal 610 upon transfer of information from intermediate to active or final storage, the multivibrator 640 generates a pulse having a certain duration, preferably on the order of five microseconds, and at the termination of that pulse, the negative input pulser 639 applies an enabling pulse to all of the gates 621–624, 629, and 635. The flip-flops 617–620 are then set or reset in accordance with signals on lines 601–606 and 609. However, if there should be no signals on any of the lines 601–606 and 609, the flip-flops 617–620 will remain in the same condition as they were before applying the enabling pulse to the gates.

By way of example, if the linear terminal 601 is high and the normal terminal 602 is high, reset signals are applied to flip-flops 617 and 618 from the output of the gate 629 and reset pulses are applied to the flip-flops 619 and 620 from the output of gate 635, thus placing all flip-flops in the reset condition, regardless of their previous state. As another example, if the short terminal 603 and the CCW terminal 605 are high, the flip-flops 617 and 619 will be set by signals applied from the signals of outputs of gates 621 and 623. At this time, the flip-flops 618 and 620 are reset by signals applied from inverters 641 and 642 having inputs connected to reset outputs of the flip-flops 617 and 619. Similarly, if the long terminal 604 and the CW terminal 606 are high, flip-flops 618 and 620 will be set, and flip-flops 617 and 619 will be reset by signals applied from inverters 643 and 644 having inputs connected to the reset outputs of the flip-flops 618 and 620.

The short output terminal 584 and the long output terminal 585 are repsectively connected to the outputs of inverters 641 and 643 to be high in accordance with respective setting of the flip-flops 617 and 618. The circle terminal 586 is connected to the output of an inverter 646 having an input connected to the output of a complementary emitter follower 648 having an input connected to an inverter 649 the input of which is connected to the output of an OR gate 650 having inputs connected to the outputs of the inverters 642 and 644. With this arrangement, the circle terminal 586 is high when either the flip-flops 619 or the flip-flop 620 is set by CCW or CW signals applied to input terminals 605 and 606.

The CW output terminal 587 is connected to the output of an inverter 651 having an input connected to the output of a gate 652 one input of the gate being connected to the output of the inverter 646 and the other input being connected to the output of an emitter follower 653. The input of the emitter follower 653 is connected to the output of an OR gate 654 having inputs connected to four AND gates 655–658. Gate 655 has one input connected to the output of the inverter 642, a second input connected to the output of an inverter 659 having an input connected to the *x* plus terminal 607, and a third input terminal connected to the output of an inverter 660 having an input connected to the *y* plus terminal 608. Gate 656 has inputs repsectively connected to the output of inverter 642, terminal 607 and terminal 608. Gate 657 has inputs connected to the output of inverter 644, the output of inverter 659 and the terminal 608. Gate 658 has inputs connected to the output of inverter 644, the output of inverter 660 and the terminal 607.

With this arrangement, gate 655 developes an output with counterclockwise, *x* minus and *y* minus signals; gate 656 develops an output with counterclockwise *x* plus and *y* plus signals; gate 657 develops an output with clockwise, *x* minus and *y* plus signals; and gate 658 develops an output with clockwise, *x* plus and *y* minus signals. Under such conditions, the terminal 587 is properly energized.

The CW, CCW and linear terminals 588, 589 and 590 are respectively connected to the outputs of complementary emitter followers 661–663 having inputs connected to the outputs of gates 664–666. Gate 64 has one input connected to the output of inverter 646 a second input connected to the output of inverter 651 and a third input connected to the output of inverter 667 having an input connected to the delayed output terminal of a multivibrator 668 having an input connected to the terminal 610. The multivibrator 668 and inverter 667 serve to enable the gate 664 at the proper time, while the gate 664 is enabled by signals applied from the outputs of inverters 646 and 651 to develop an output signal at terminal 588. Gate 665 has one input connected to the output of the emitter follower 653 and a second input connected to the output of inverter 667.

Gate 666 has one input connected to the output of inverter 649 and a second input connected to the output of the inverter 667. The output of inverter 649 is low when either of the flip-flops 619 or 620 is set by signals applied on the CCW and CW terminal 605 and 606 but is otherwise high, which of course indicates linear interpolation.

Terminals 595–598 are connected to the outputs of complementary emitter followers 671–674 having inputs connected to the outputs of gates 675–678, inputs thereof being connected to the outputs of inverters 679–682. The input of inverter 679 is connected to the output of a gate 683 having one input connected to the terminal 611 and a second input connected to the output of inverter 651. The input of inverter 680 is connected to the output of complementary emitter follower 632. The input of inverter 681 is connected to the output of a gate 684 having one input connected to the output of inverter 651 and a second input connected to the terminal 613. The input of inverter 682 is connected to the output of an OR gate 685 having one input connected to the output of complementary emitter follower 632 and a second input connected to the output of an inverter 686 the input of which is connected to the output of inverter 651.

Additional inputs of all four gates 675–678 are connected to the output of an inverter 688 having an input connected to a normal output terminal of the multivibrator 668, the gates being thus inhibited at the proper time.

As an example of the operation of the circuit in applying proper sign information to the *i* and *j* integrand registers, assume that a CCW signal is applied to input terminal 598. Gate 675 will be disabled or inhibited from with no signal on terminal 608, thus indicating *y* minus, under such circumstances, the *i* integrand register should be diminished in response to *y* pulses, while the *j* integrand register should be increased in response to *x* pulses. Accordingly, a minus signal should be applied from terminal 598 to the *i* integrand registers, and a plus signal should be applied from terminal 596 to the *j* integrand registers. This result will be obtained with the illustrated circuit, wherein all of the gates 655–658 have low outputs in the example to produce a low output at the output of gate 654, and a high signal at the output of gate 651 thus gate 676 will be enabled to develop a signal at terminal 596 and also, through inverters 686 and 682, gate 678 will be enabled to develop a signal at the output terminal 598. Gate 675 will be disabled or inhibited from inverter 679 the input of which is high from a signal applied from the output of inverter 651 and similarly, the gate 677 will be disabled from the inverter 681 and gate 684.

A specific feature of the invention is in the application of setup signals from the terminals 588–590 of the circuit 66 to terminals 591–593 of the dual channel accumulator registers, and to the decades therewithin, in a manner to minimize errors. In particular, setup signals are so applied that in counterclockwise rotation, a count of nine is initially entered in the *i* or upper half of each accumulator register unit, while a zero is entered into the *j* or lower half thereof. In clockwise rotation, the reverse is true, a nine being entered into the *j* or lower portion, while the zero is entered into the *i* or upper portion. In linear interpolation, a zero is entered into both portions.

In particular, as shown in FIGURE 4, the CW terminal 591 is connected to drive set inputs of the flip-flops 115 and 118, through a diode 690 to a circuit point 691 connected to drive set inputs of the flip-flops 116 and 117 and also of the flip-flops 112 and 113, circuit point 691 being additionally connected to drive reset terminals of the storage flip-flops 173 and 174. The CW input is further connected through a diode 692 to drive reset inputs of the flip-flops 111 and 114. Similarly, the CCW terminal 592 is connected directly to drive set terminals of the flip-flops 111 and 114, through a diode 693 to the circuit point 691, and through a diode 694 to drive reset inputs of the flip-flops 115 and 118. The linear terminal 593 is connected through a diode 695 to the drive reset inputs of flip-flops 115 and 118, through a diode 696 to drive reset inputs of the flip-flops 111 and 114, and through a diode 697 to the circuit point 691.

THREAD CUTTING CONTROL

Figure 20:
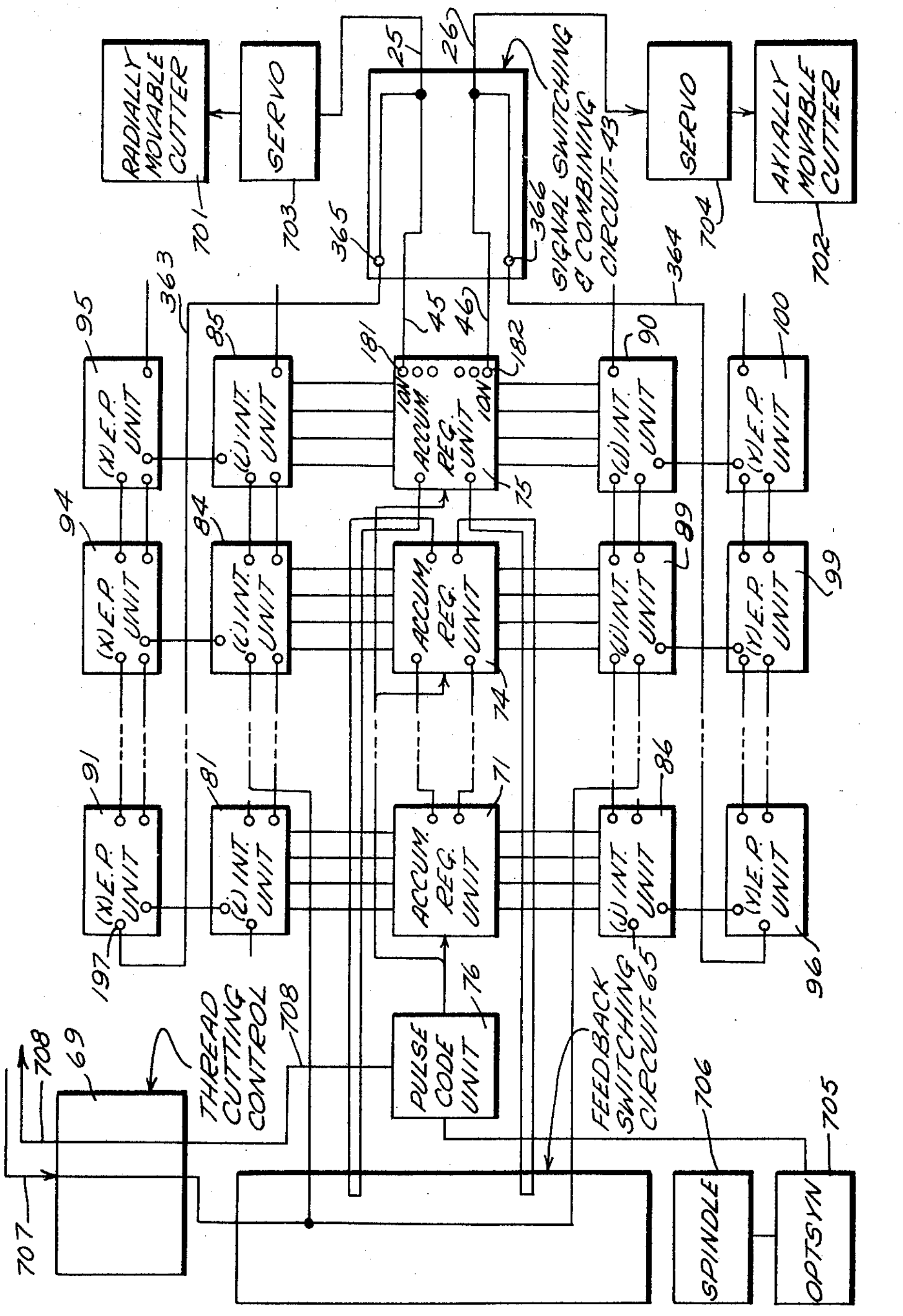
FIGURE 20 is a diagram showing operation of the system for thread cutting.

FIGURE 20 shows the primary circuit connections for thread cutting control wherein the movement of either a radially movable cutter 701 or an axially movable 702 is controlled from servo systems 703 and 704, to which pulses may be applied from the lines 25 and 26. The system is arranged to move either cutter in constant proportion to rotation of a lathe spindle, to obtain a fixed lead, or in variable proportion to obtain an increasing or decreasing lead.

The connections within the circuit 43 are the same as for normal linear interpolation as illustrated in FIGURE 9. However, the pulses applied to the pulse code unit, instead of being derived from the feed rate generator 62, are derived from an optsyn 705 connected to the lathe spindle 706, the optsyn being a device to generate pulses in response to rotation of the spindle. For example, the device may generate 10,000 pulses for each revolution of the lathe spindle.

To obtain a constant lead, programmed words are entered into the *i* integrand units 81–85 of the *j* integrand units 86–90, and the units are not serially modified during the thread cutting operation. To obtain an increasing or decreasing lead, however, pulses are applied serially to the inputs of the second unit of one of the integrand registers, either the unit 82 or the unit 87. Such pulses are applied from a line 707 from the feed rate generator 62 which, as diagrammatically illustrated, is connected through the thread cutting control 69 and through the feedback switching circuit 65 to the inputs to the units 82 and 87. To synchronize the modifying pulses with the operation of the accumulator registers, carry pulses from the pulse code unit 76 are applied through a line 708, through connections in the thread cutting control 69 to the feed rate generator 62.

To obtain the proper setup of the integrand registers, appropriate signals are applied to the terminals 611–614 of the operation mode control circuit 66 illustrated in FIGURE 19.

It should be noted that although it is not impossible to move both a radially movable cutter and an axially movable cutter at the same time, or to move a single cutter with components of movement in both direction, the system as illustrated in FIGURE 20 is normally used to move only one cutter at a time, either in a radial direction or an axial direction.

It will be understood that modifications and variations may be effected without departing from the spirit and scope of the novel concepts of this invention.

I claim as my invention:

1. In a numerical control system for responding to program information to generate trains of command pulses on *x* and *y* output lines, for performing relative *x* and *y* movements proportional to the respective number of command pulses, a pair of operational integrators each comprising an integrand register and an accumulator register each including serially connected decade units, parallel connection means between each integrand register decade unit of said integrand register and an associated one of the accumulator register decade units, means for simultaneously operating all of said accumulator register decade units through an addition cycle to cause each accumulator register decade unit to add a number stored therein at the beginning of a cycle to a number supplied in parallel from the associated integrand register decade unit and to cause transmission of carry pulses serially from each accumulator register decade unit to a succeeding accumulator register decade unit, and means for applying pulses from the final accumulator register decade unit of each of said operational integrators to a respective one of said *x* and *y* output lines.

2. In a numerical control system for responding to program information to generate trains of command pulses on *x* and *y* output lines, for performing relative *x* and *y* movements proportional to the respective numbers of command pulses, a pair of operational integrators each comprising an integrand register and an accumulator register each including serially connected decade units, means operative with a 5, 2, 1′, 1 code for transferring program information in parallel to said integrand register decade units, parallel connection means operative with a 5, 2, 1′, 1 code between each integrand register decade unit of said integrand register and an associated one of the accumulator register decade units, means including a 5, 2, 1′, 1 pulse code unit for simultaneously operating all of said accumulator register decade units through an addition cycle to cause each accumulator register decade unit to add a number stored therein at the beginning of a cycle to a number supplied in parallel from the associated integrand register decade unit and to cause transmission to carry pulses serially from each accumulator register decade unit to a succeeding accumulator register decade unit, and means for applying pulses from the final accumulator register decade unit of each of said operational integrators to a respective one of said *x* and *y* output lines.

3. In a numerical control system for responding to a block of input program information to generate trains of command pulses on *x* and *y* output lines, for performing relative *x* and *y* movements proportional to the respective numbers of command pulses, said system being selectively operable with linear interpolation wherein said program information includes *x* and *y* words representing the *x* and *y* distances from a beginning point to an end point and with circle interpolation wherein said program information includes *i* and *j* words representing the *x* and *y* distances from the beginning point to the center of a circular path of movement, *i* and *j* operational integrators each comprising an integrand register and an accumulator register each including serially connected decade units, parallel connection means in each integrator between respective ones of said integrand and accumulator decade units, means for simultaneously operating all of said accumulator register decade units through an addition cycle to cause each accumulator register decade unit to add a number stored therein at the beginning of a cycle to a number supplied in parallel from the associated integrand register decade unit and to cause transmission of carry pulses serially from each accumulator register decade unit to a succeeding accumulator register decade unit, means operable in linear interpolation for applying said *x* and *y* words to said *i* and *j* integrand registers, means operable in linear interpolation for applying output pulses from said *i* and *j* accumulator registers to said *x* and *y* output lines respectively, means operable in circular interpolation for applying said *i* and *j* words to said *i* and *j* integrand registers, means operable in circular interpolation for applying output pulses from said *i* and *j* accumulator registers to inputs of said *j* and *i* integrand registers respectively, and means operable in circular interpolation for applying output pulses from said *i* and *j* accumulator registers to said *y* and *x* output lines respectively.

4. In numerical control system for responding to a block of input program information to generate trains of command pulses on *x* and *y* output lines and performing relative *x* and *y* movements proportional to the respective numbers of command pulses, said system being selectively operable with linear interpolation wherein said program information includes *x* and *y* words representing the *x* and *y* distances from a beginning point to an end point and with circular interpolation wherein said program information includes said *x* and *y* words and also *i* and *j* words representing the *x* and *y* distances from the beginning point to the center of a circular path of movement, *x* and *y* end point diminishing storage registers, *i* and *j* operational integrators each comprising an integrand register and an accumulator register each including serially connected decade units, parallel connection means in each integrator between respective ones of said integrand and accumulator decade units, means for simultaneously operating all of said accumulator decade units through an addition cycle to cause each accumulator decade unit to add a number stored therein at the beginning of a cycle to a number supplied in parallel from the associated integrand decade unit and to cause transmission of carry pulses serially from each accumulator decade unit to a succeeding accumulator decade unit, means operable in linear interpolation for applying said $x$ and $y$ words to both said $x$ and $y$ end point registers and said $i$ and $j$ integrand registers, means operable in linear interpolation for applying output pulses from said $i$ and $j$ accumulator registers to said $x$ and $y$ output lines respectively, means operable in circular interpolation for applying said $x$ and $y$ words to said $x$ and $y$ end point registers and said $i$ and $j$ words to said $i$ and $j$ integrand registers, means operable in circular interpolation for applying output pulses from said $i$ and $j$ accumulator registers to inputs of said $j$ and $i$ integrand registers respectively, and means operable in circular interpolation for applying output pulses from said $i$ and $j$ accumulator registers to said $y$ and $x$ output lines respectively.

5. In a numerical control system for responding to program information to generate trains of command pulses on $x$ and $y$ output lines for performing relative $x$ and $y$ movements proportional to the respective numbers of command pulses, a pair of operational integrators each comprising an integrand register and an accumulator register, a pulse code unit operable through a cycle of operation to produce four series of pulses and a carry pulse in each cycle of operation thereof with the numbers of pulses in said series being selectively addable to produce any number from one through nine and with the pulses of each series being non-coincident with the carry pulse and the pulses of the other series, serially connected register units in said accumulator register each comprising a decade counter having an input and an output, four gates for selectively applying said four series of pulses to said decade counter input, means for storing an output pulse from said decade counter, means responsive to a carry pulse from said pulse code unit for transmitting a stored output pulse to the input of a subsequent unit, serially connected register units in said integrand register, and four lines connecting said gates of each accumulator register unit to an integrand register unit for parallel control therefrom.

6. In a numerical control system for responding to program information to generate trains of command pulses on $x$ and $y$ output lines, for performing relative $x$ and $y$ movements proportional to the respective numbers of command pulses, said program information including $i$ and $j$ words respectively representing the $x$ and $y$ distances from a beginning point to the center of a circular path of movement, $i$ and $j$ operational integrators each comprising an integrand register and an accumulator register each including serially connected decade units, means for applying $i$ and $j$ words in parallel to said $i$ and $j$ integrand register units, parallel connection means in each integrator between said integrand and accumulator units, means for simultaneously operating all of said accumulator register decade units through an addition cycle to cause each unit to add a number stored therein at the beginning of a cycle to a number supplied in parallel from the associated integrand register unit and to cause transmission of carry pulses serially from each accumulator register unit to a succeeding unit, means for applying output pulses from said $i$ and $j$ accumulator registers to inputs of said $j$ and $i$ integrand registers respectively, and means for applying output pulses from said $i$ and $j$ accumulator registers to said $y$ and $x$ output lines respectively.

7. In a numerical control system for responding to program information to generate trains of command pulses on $x$ and $y$ output lines, for performing relative $x$ and $y$ movements proportional to the respective numbers of command pulses, said program information in cluding $i$ and $j$ words respectively representing the $x$ and $y$ distances from a beginning point to the center of a circular path of movement, $i$ and $j$ operational integrators each comprising an integrand register and an accumulator register each including serially connected decade units, means for applying $i$ and $j$ words in parallel to said $i$ and $j$ integrand register units, parallel connection means in each integrator between said integrand and accumulator units, means for simultaneously operating all of said accumulator register decade units through an addition cycle to cause each unit to add a number stored therein at the beginning of a cycle to a number supplied in parallel from the associated integrand register unit and to cause transmission of carry pulses serially from each accumulator register unit to a succeeding unit, means for applying output pulses from said $i$ and $j$ accumulator registers to inputs of said $j$ and $i$ integrand registers respectively, means for supplying said output pulses from said $i$ and $j$ accumulator registers to said $y$ and $x$ output lines respectively, and means for selectively applying output pulses from said $i$ and $j$ accumulator to said $y$ and $x$ output lines respectively at rates ten times the rates of application of outer pulses to the inputs of said $j$ and $i$ integrand registers.

8. In a numerical control system for responding to program information to generate trains of command pulses on $x$ and $y$ output lines, for performing relative $x$ and $y$ movements proportional to the respective numbers of command pulses, said program information including $x$ and $y$ words respectively representing the $x$ and $y$ distances from a beginning point to an end point, $x$ and $y$ end point diminishing storage registers, first and second operational integrators each comprising an integrand register and an accumulator register each including serially connected decade units, parallel connection means in each integrator between said integrand register units and accumulator register units, means for simultaneously operating all of said accumulator register units through an addition cycle to cause each unit to add a number stored therein at the beginning of a cycle to a number supplied in parallel from the associated register unit and to cause transmission of carry pulses serially from each accumulator register unit to a succeeding accumulator register unit, means for applying said $x$ and $y$ words to both said $x$ and $y$ end point registers and said integrand registers of said first and second operational integrators, means for applying output pulses from said accumulator registers of said first and second integrators to said $x$ and $y$ output lines respectively, means for applying output pulses from said accumulator registers of said first and second integrators to said $x$ and $y$ end point storage registers, and means responsive to an output from either of said end point storage registers for terminating operation of said operational integrators.

9. In a numerical control system for responding to program information to generate trains of command pulses on $x$ and $y$ output lines, for performing relative $x$ and $y$ movements proportional to the respective numbers of command pulses, said program information including $x$ and $y$ words respectively representing the $x$ and $y$ distances from a beginning point to an end point, $x$ and $y$ end point diminishing storage registers, first and second operational integrators each comprising an integrand register and an accumulator register each including serially connected decade units, parallel connection means in each integrator between said integrand register units and accumulator register units, means for simultaneously operating all of said accumulator register units through an addition cycle to cause each unit to add a number stored therein at the beginning of a cycle to a number supplied in parallel from the associated register unit and to cause transmission of carry pulses serially from each accumulator register unit to a succeeding accumulator register unit, means for applying said $x$ and $y$ words to both said $x$ and $y$ end point registers and said integrand registers of said first and second operational integrators, means for applying output pulses from said accumulator registers of said first and second integrators to said $x$ and $y$ output lines respectively, means for applying output pulses from said accumulator registers of said first and second integrators to said x and y end point storage registers, means responsive to an output from either of said end point storage registers for terminating operation of said operational integrators, and means for selectively applying said output pulses to said end point storage registers at the same rate as applied to said output lines and at a rate one-tenth the rate of application to said output lines.

10. In a numerical control system for responding to a block of input program information to generate trains of command pulses on x and y output lines, for performing x and y movements proportional to the respective numbers of command pulses, said program information including x and y words representing the x and y distances from a beginning point to an end point and i and j words representing the x and y distances from the beginning point to the center of a circular path of movement, x and y end point diminishing storage registers, i and j operational integrators each comprising an integrand register and an accumulator register each including serially connected decade units, parallel connection means in each integrator between said integrand and accumulator decade units, means for simultaneously operating all of said accumulator register units through an addition cycle to cause each unit to add a number stored therein at the beginning of a cycle to a number supplied in parallel from the associated integrand register unit and to cause transmission of carry pulses serially from each accumulator register unit to a succeeding unit, means for initially supplying said x and y words to said x and y end point diminishiing storage register, means for initially supplying said i and j words to said i and j integrand registers, means for applying output pulses from said i and j accumulator register to inputs of said j and i integrand registers respectively, means for applying output pulses from said i and j accumulator registers to said y and x output lines respectively, means for applying output pulses from said i and j accumulator registers to said y and x end point registers, and means responsive to an output signal from either of said end point registers for stopping operation of said operational integrators.

11. In a numerical control system for responding to a block of input program information to generate trains of command pulses on x and y outputs lines, for performing x and y movements proportional to the respective numbers of command pulses, said program information including x and y words representing the x and y distances from a beginning point to an end point and i and j words representing the x and y distances from the beginning point to the center of a circular path of movement, x and y end point diminishing storage registers, i and j operational integrators each comprising an integrand register and an accumulator register each including serially connected decade units, parallel connection means in each integrator between said integrand and accumulator decade units, means for simultaneously operating all of said accumulator decade units through an addition cycle to cause each accumulator decade unit to add a number stored therein at the beginning of a cycle to a number supplied in parallel from the associated integrand decade unit and to cause transmission of carry pulses serially from each accumulator decade unit to a succeeding accumulator decade unit, means for initially supplying said x and y words to said x and y end point diminishing storage register, means for initially supplying said i and j words to said i and j integrand registers, means for applying output pulses from said i and j accumulator registers to inputs of said j and i integrand registers respectively, means for applying output pulses from said i and j accumulator registers to said y and x output lines respectively, means for applying output pulses from said i and j accumulator registers to said y and x end point registers, means responsive to an output signal from either of said end point registers for stopping operation of said operational integrators, means responsive to an output signal from said x end point register for thereafter applying pulses on said y output line until an output signal is developed by said y end point reigster and means responsive to an output signal from said y end point register for thereafter supplying pulses on said x output line until an output signal is developed by said x end point register.

12. In a numerical control system for responding to program information to generate trains of command pulses on x and y output lines, for performing relative x and y movements proportional to the respective numbers of command pulses, said program information including x and y words representing the x and y distances from a beginning point to an end point, first and second operational integrators each comprising an integrand register and an accumulator register each including serially connected units, parallel connection means in each integrator between said integrand and accumulator units, means for simultaneously operating all of said accumulator units through an addition cycle to cause each accumulator unit to add a number stored therein at the beginning of a cycle to a number supplied in parallel from the associated integrand unit and to cause transmission of carry pulses serially from each accumulator unit to a succeeding accumulator unit, means for applying said x and y words to the integrand registers of said first and second integrators, and means for applying output pulses from the final accumulator unit of each of said first and second integrators to a respective one of said x and y output lines.

13. In a numerical control system for responding to program information to generate trains of command pulses on x and y output lines, for performing relative x and y movements proportional to the respective numbers of command pulses, said program information including x and y words representing the x and y distances from a beginning point to an end point, first and second operational integrators each comprising an integrand register and an accumulator register each including serially connected units, parallel connection means in each integrator between said integrand and accumulator units, means for simultaneously operating all of said accumulator units through an addition cycle to cause each accumulator unit to add a number stored therein at the beginning of a cycle to a number supplied in parallel from the associated integrand unit and to cause transmission of carry pulses serially from each accumulator unit to a succeeding accumulator unit, means for applying said x and y words to the integrand registers of said first and second integrators, means for applying output pulses from the final accumulator unit of each of said first and second integrators to a respective one of said x and y output lines, and means for selectively applying to said x and y output lines output pulses from the accumulator units preceding the final accumulator units when the respective most significant digits of the x and y words are zero.

14. In a numerical control system for responding to program information to generate trains of command pulses on x and y output lines, a pair of operational integrators each comprising an integrand register including serially connected integrand units and an accumulator register including serially connected accumulator units, parallel connection means in each integrator between said integrand and accumulator units, a pulse code unit connected to said accumulator units and operable through a cycle to cause each accumulator unit to add a count stored therein at the beginning of a cycle to a count supplied in parallel from the associated integrand unit, and means for supplying output pulses from the final accumulator unit of each of the accumulator registers of said integrators to a respective one of said first and second output lines.

15. In a numerical control system for responding to program information to generate trains of command pulses on x and y output lines, for performing relative x and y movements proportional to the respective numbers of command pulses, said program information including i and j words respectively representing the x and y distances from a beginning point to the center of a circular path of movement, $i$ and $j$ operational integrators each comprising an integrand and an accumulator register each including serially connected units, means for applying $i$ and $j$ words in parallel to said integrand units of said $i$ and $j$ integrators, parallel connection means in each integrator between said integrand and accumulator units, means for supplying output pulses from the final accumulator unit of each of the $i$ and $j$ integrators to one of said $y$ and $x$ output lines respectively and to the inputs of one of said $j$ and $i$ integrand registers respectively, and means for selectively supplying output pulses from the accumulator registers of the $i$ and $j$ integrators preceding the final accumulator register units to said $y$ and $x$ output lines respectively and to the inputs of said $j$ and $i$ integrand registers respectively.

16. In a numerical control system for responding to program information to generate trains of command pulses on $x$ and $y$ output lines, said program information including $i$ and $j$ words respectively representing the $x$ and $y$ distances from a beginning point to the center of a circular path of movement, $i$ and $j$ operational integrators each comprising an integrand register and an accumulator register each including serially connected units including first, second and final accumulator units and first, second and final integrand units, means for applying $i$ and $j$ words in parallel to said integrand units of said $i$ and $j$ integrators, parallel connection means in each integrator between said integrand and accumulator units, means for simultaneously operating all of said accumulator units through an addition cycle to cause each accumulator unit to add a number stored therein at the beginning of a cycle to a number supplied in parallel from the associated integrand unit and to cause transmission of carry pulses serially from each accumulator unit to a succeeding accumulator unit, means for supplying ouput pulses from the final accumulator unit of each of said $i$ and $j$ integrators to said $y$ and $x$ output lines, means for supplying output pulses from the final accumulator units of said $i$ and $j$ integrators to the inputs of the first integrand units of said $j$ and $i$ integrand units, and means for selectively supplying output pulses from the final accumulator units of said $i$ and $j$ integrators to the inputs of the second integrand units of said $j$ and $i$ integrators.

17. In a numerical control system for controlling movement of a thread cutter relative to a spindle, an operational integrator comprising an integrand register and an accumulator register each including serially connected units, parallel connection means in said integrator between each integrand register unit and an associated one of the accumulator register units, addition control means for simultaneously operating all of said accumulator register units through an addition cycle to cause each accumulator register unit to add a number stored therein at the beginning of a cycle to a number supplied in parallel from the associated integrand register unit and to cause transmission of carry pulses serially from each accumulator register unit to a succeeding accumulator register unit, means for responding to rotation of the spindle to generate control pulses, means for applying said control pulses to said addition control means to control operation thereof, means connected to the output of said accumulator register for applying pulses for control of cutter movement, and means connected to said addition control means for applying modifying pulses to said integrand register at times between addition cycles of said addition control means.

18. In a numerical control system for responding to program information to generate trains of command pulses on $x$ and $y$ output lines and to produce movement of an output along respective $x$ and $y$ axes, a pair of operational integrators each comprising an integrand register and an accumulator register each including serially connected units, parallel connection means in each integrator between said integrand and accumulator register units, a feed rate generator for supplying pulses at a rate proportional to a desired speed of movement of the output, means responsive to said pulses from said feed rate generator for simultaneously operating all of said accumulator register units through an addition cycle to cause each accumulator register unit to add a number stored therein at the beginning of a cycle to a number supplied in parallel from the associated integrand register unit and to cause transmission of carry pulses serially from each accumulator register unit to a succeeding accumulator register unit, and means for applying pulses from the accumulator registers to said $x$ and $y$ output lines.

19. In a digital computer system, a plurality of integrand decade units for storing respective digits of a plural digit decimal number therein, a plurality of accumulator register decade units for storing respective decimal digits therein, parallel connection means between respective corresponding ones of said integrand and accumulator register decade units, means for simultaneously operating all of said accumulator register decade units through an addition cycle for adding respective decimal digits initially stored therein at the beginning of an addition cycle to respective decimal digits applied in parallel from respective corresponding ones of said integrand decade units, means for connecting said accumulator register decade units in series for applying carry signals from each accumulator register decade unit to a succeeding accumulator register decade unit after each addition cycle, and means for connecting said integrand decade units in series for changing the digit stored in each integrand decade unit in response to a signal from a preceding integrand decade unit.

20. In a digital computer, a plurality of integrand register units for storing digits of a plural digit number therein, a plurality of accumulator register units arranged for storing digits therein, parallel connection means between each of said integrand register units and an associated one of said accumulator register units, means for simultaneously operating all of said accumulator register units through an addition cycle for adding digits stored therein at the beginning of a cycle to digits applied in parallel from said integrand register units, and means connecting said accumulator register units in series for applying carry signals from each accumulator register unit to a succeeding accumulator register unit after each addition cycle.

21. In a digital computer system, a pair of operational integrators each comprising an integrand register and an accumulator register, each of said integrand registers comprising serially connected integrand decade units adapted to receive information in parallel and to selectively add and subtract serially in response to input pulses, each of said accumulator registers comprising serially connected accumulator decade units connected in parallel to said integrand decade units and arranged to cyclically add a count stored therein at the beginning of a cycle to a count supplied in parallel from an associated integrand decade unit, means for applying output pulses from each accumulator register to the input of the integrand register of the other integrator, and means for operating the integrand register of one integrator in an addition mode while operating the integrand register of the other integrator in a subtraction mode.

22. In a digital computer system, a pair of operational integrators each comprising an integrand register and an accumulator register, each of said integrand registers comprising serially connected integrand decade units adapted to receive information in parallel and to selectively add and subtract serially in response to input pulses, each of said accumulator registers comprising serially connected accumulator decade units connected in parallel to said integrand decade units and arranged to cyclically add a count stored therein at the beginning of a cycle to a count supplied in parallel from an associated integrand decade unit, means for applying output pulses from each accumulator register to the input of the integrand register of the other integrator, means for operating the integrand register of one integrator in an addition mode while operating the integrand register of the other integrator in a subtraction mode, and means for initially entering a count of nine into the accumulator register decade units of said one integrator while initially entering a count of zero in the accumulator register decade units of said other integrator.

23. In a numerical control system for responding to program information to generate trains of command pulses on *x* and *y* output lines, *i* and *j* operational integrators each comprising serially connected integrand register units and serially connected accumulator register units with parallel connections between respective ones of said integrand and accumulator register units, a count-storing decade in each of said accumulator register units, means for cyclically applying pulses to each decade to increase the count stored in each decade in accordance with information supplied in parallel from the integrand unit having parallel connection therewith, means for applying carry pulses from each decade to the input of the decade of a subsequent accumulator register unit, means for applying carry pulses from the decade of the final *i* and *j* accumulator register units to the inputs of the *j* and *i* integrand registers respectively, and means for applying to said *x* and *y* output lines the pulses applied to the inputs of the decades of the final *j* and *i* accumulator register units.

24. In a numerical control system for responding to program information to generate trains of command pulses on *x* and *y* output lines, *i* and *j* operational integrators each comprising serially connected integrand register units and serially connected accumulator register units with parallel connections between said integrand and accumulator register units, a count-storing decade in each of said accumulator register units, means for cyclically applying pulses to each decade to increase the count stored in each decade in accordance with information supplied in parallel from the associated integrand unit, means for applying carry pulses from each decade to the input of the decade of a subsequent unit, means for applying carry pulses from the decade of the final *i* and *j* accumulator register units to the inputs of the *j* and *i* integrand registers respectively, means for applying to said *x* and *y* output lines the pulses applied to the inputs of the decade of the final *j* and *i* accumulator register units, and means for operating one of said integrand registers in a serial subtraction mode while operating the other in a serial addition mode.

25. In a numerical control system for responding to program information to generate trains of command pulses on *x* and *y* output lines, *i* and *j* operational integrators each comprising serially connected integrand register units and serially connected accumulator register units with parallel connections between said integrand and accumulator register units, a count-storing decade in each of said accumulator register units, means for cyclically applying pulses to each decade to increase the count stored in each decade in accordance with information supplied in parallel from the associated integrand unit, means for applying carry pulses from each decade to the input of the decade of a subsequent unit, means for applying carry pulses from the decade of the final *i* and *j* accumulator register units to the inputs of the *j* and *i* intergrand registers respectively, means for applying to said *x* and *y* output lines the pulses applied to the inputs of the decade of the final *j* and *i* accumulator register units, means for operating one of said integrand registers in a serial subtraction mode while operating the other in a serial addition mode, means operative when said *i* integrator is in an addition mode for deleting pulses from the *y* output line in response to each output pulse from the *j* integrand register unit preceding the final *j* integrand register unit, and means operative when said *j* integrand register is in an addition mode for deleting output pulses from the *x* output line in response to each output pulse from the integrand register unit preceding the final *i* integrand register unit.

26. In a numerical control system for responding to program information to generate trains of command pulses on *x* and *y* output lines, *i* and *j* operational integrators each comprising integrand and accumulator registers and means for operating said accumulator register to add a count initially stored therein to a count applied from said integrand register, means for applying output pulses from said *i* and *j* accumulator registers to the inputs of said *j* and *i* integrand registers, and means for applying output pulses from said *i* and *j* accumulator registers to said *y* and *x* output lines, said *i* and *j* integrand registers comprising register units connected in series and each comprising four flip-flops with a zero count being represented by a reset condition of all four of said flip-flops, and AND gate in each unit having five inputs and an output, means connecting one of said inputs to the output of the preceding unit, means connecting the other four of said five inputs to said four flip-flops to develop an output from said gate in response to concurrence of a reset condition of all four of said flip-flops and a signal from the output of the gate of the preceding unit, and means responsive to an output signal from the gate of the final unit of either integrand register for stopping operation of said integrators.

27. In a numerical control system for responding to program information to generate trains of command pulses on *x* and *y* output lines, *i* and *j* operational integrators each comprising integrand and accumulator registers and means for cylically operating said accumulator register to add a count initially stored therein to a count applied from said integrand register, means for applying output pulses from said *i* and *j* accumulator registers to the inputs of said *j* and *i* integrand registers, means for applying output pulses from said *i* and *j* accumulator registers to said *y* and *x* output lines, means for operating one of said *i* and *j* integrand registers in a subtraction mode while operating the other in an addition mode, and means responsive to storage of a zero count in the integrand register operated in the subtraction mode for stopping operation of said integrators.

28. In a numerical control system for responding to program information to generate trains of command pulses on *x* and *y* output lines, said program information including *x* and *y* words respectively representing the *x* and *y* distances from a beginning point to an end point, *x* and *y* end point diminishing storage registers, first and second operational integrators each comprising integrand and accumulator registers and means for cylically operating said accumulator register to add a count initially stored therein to a count applied from said integrand register, means for applying output pulses from said accumulator registers of said first and second integrators to said *x* and *y* output lines respectively, means for applying output pulses from said accumulator registers of said first and second integrators to said *x* and *y* end point diminishing storage registers, said *x* and *y* end point diminishing storage registers comprising a plurality of units connected in series and each comprising four flip-flops with a zero count being represented by a reset condition of all four of said flip-flops, an AND gate in each unit having five inputs and an output, means connecting one of said inputs to the output of the preceding unit, means connecting the other four of said five inputs to said four flip-flops to develop an output from said gate in response to concurrence of a reset condition of all four of said flip-flops and a signal from the output of the gate of the preceding unit, and means responsive to an output signal from the gate of the final unit of either integrand register for stopping operation of said integrators.

29. In a numerical control system for responding to program information to generate trains of command pulses on $x$ and $y$ output lines, said program information including $x$ and $y$ words representing the $x$ and $y$ distances from a beginning point to an end point and $i$ and $j$ words representing the $x$ and $y$ distances from the beginning point to the center of a circular path of movement, $x$ and $y$ end point diminishing storage registers, $i$ and $j$ operational integrators each comprising integrand and accumulator registers and means for cyclically operating said accumulator register to add a count initially stored therein to a count applied from said integrand register, means for applying output pulses from said $i$ and $j$ accumulator registers to the inputs of said $j$ and $i$ integrand registers, means for applying output pulses from said $i$ and $j$ accumulator registers to said $y$ and $x$ output lines, means responsive to storage of a zero count in either of said integrand registers for stopping operation of said integrators, means for thereafter applying pulses on both of said $x$ and $y$ output lines, means for then stopping application of pulses on said $x$ output lines in response to a signal from said $x$ end point register, and means stopping application of pulses on said $y$ output line in response to a signal from said $y$ end point register.

References Cited

UNITED STATES PATENTS

| | | | |
|---|---|---|---|
| 2,936,116 | 5/1960 | Adamson et al. | 235—165 |
| 3,027,078 | 3/1962 | Steele | 235—152 |
| 3,050,251 | 8/1962 | Steele | 235—164 |
| 3,148,273 | 9/1964 | Truitt et al. | 235—150.31 |
| 3,246,125 | 4/1966 | Mergler | 235—151.11 X |
| 3,254,203 | 5/1966 | Kviem | 235—152 |
| 3,325,630 | 6/1967 | Murakami | 235—151.11 X |

EUGENE G. BOTZ, Primary Examiner

R. W. WEIG, Assistant Examiner

U.S. Cl. X.R.

235—151.11